(12) United States Patent
Iwabuchi

(10) Patent No.: US 9,365,080 B2
(45) Date of Patent: Jun. 14, 2016

(54) TIRE

(75) Inventor: Sotaro Iwabuchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1028 days.

(21) Appl. No.: 13/509,718

(22) PCT Filed: Nov. 18, 2010

(86) PCT No.: PCT/JP2010/070612
§ 371 (c)(1),
(2), (4) Date: May 14, 2012

(87) PCT Pub. No.: WO2011/062241
PCT Pub. Date: May 26, 2011

(65) Prior Publication Data
US 2012/0273101 A1    Nov. 1, 2012

(30) Foreign Application Priority Data

Nov. 19, 2009  (JP) .................................. 2009-264285
Dec. 15, 2009  (JP) .................................. 2009-284269
Jan. 19, 2010  (JP) .................................. 2010-009319

(51) Int. Cl.
*B60C 13/02*    (2006.01)
*B60C 13/00*    (2006.01)
*B60C 5/00*     (2006.01)

(52) U.S. Cl.
CPC ............... *B60C 13/001* (2013.04); *B60C 5/00* (2013.01); *B60C 13/02* (2013.01); *Y10T 152/10* (2015.01)

(58) Field of Classification Search
CPC .... B60C 13/00; B60C 13/001; B60C 13/002; B60C 13/02; B60C 13/023; B60C 13/04; B60C 2013/045; Y10T 152/10
USPC .................. 152/523, 524, 151; D12/605
See application file for complete search history.

(56) References Cited

U.S. PATENT DOCUMENTS 5,807,446 A    9/1998   Ratliff, Jr.
6,149,060 A   11/2000   Meadows
(Continued)

FOREIGN PATENT DOCUMENTS

EP    0 859 703 B1    7/2001
JP    8-282215 A     10/1996
(Continued)

OTHER PUBLICATIONS

International Search Report of PCT/JP2010/070612 dated Dec. 21, 2010.
(Continued)

*Primary Examiner* — Michael H Wilson
*Assistant Examiner* — Philip N Schwartz
(74) *Attorney, Agent, or Firm* — Sughrue Mion, PLLC

(57) ABSTRACT

A pneumatic tire is provided with a decoration portion at a tire side portion. The decoration portion includes decoration elements, which include ridges, and gullies, which are inclined with respect to the tire circumferential direction and divide the decoration elements into at least two regions. Thus, the gullies make the ridges non- continuous in the tire circumferential direction. The ridges include first ridges and second ridges that are smaller than the first ridges in one or both of height and width. At least some of the first ridges are inclined with respect to the tire circumferential direction and are adjacent to one another. Thus, the gullies are formed between the adjacent first ridges.

6 Claims, 26 Drawing Sheets

(56) References Cited

U.S. PATENT DOCUMENTS

2004/0003881 A1  1/2004  Ebiko
2008/0283169 A1  11/2008  Sato et al.

FOREIGN PATENT DOCUMENTS

| JP | 9-2028 A | 1/1997 |
| JP | 9-323513 A | 12/1997 |
| JP | 11-198614 A | 7/1999 |
| JP | 2004-34860 A | 2/2004 |
| JP | 2004-291938 A | 10/2004 |
| JP | 2005-125937 A | 5/2005 |
| JP | 2006-282079 A | 10/2006 |
| JP | 2007-320469 A | 12/2007 |
| JP | 2008-062704 A | 3/2008 |
| JP | 2008-137613 A | 6/2008 |
| JP | 2008-273505 A | 11/2008 |

OTHER PUBLICATIONS

Extended European Search Report issued in European Application No. 10831634.0 dated Mar. 14, 2013.
Japanese Office Action issued in Japanese Application No. 2009-264285 dated May 7, 2013.
Japanese Office Action issued in Japanese Application No. 2010-009319 dated May 7, 2013.
Japanese Office Action issued in Japanese Application No. 2009-284269 dated May 7, 2013.

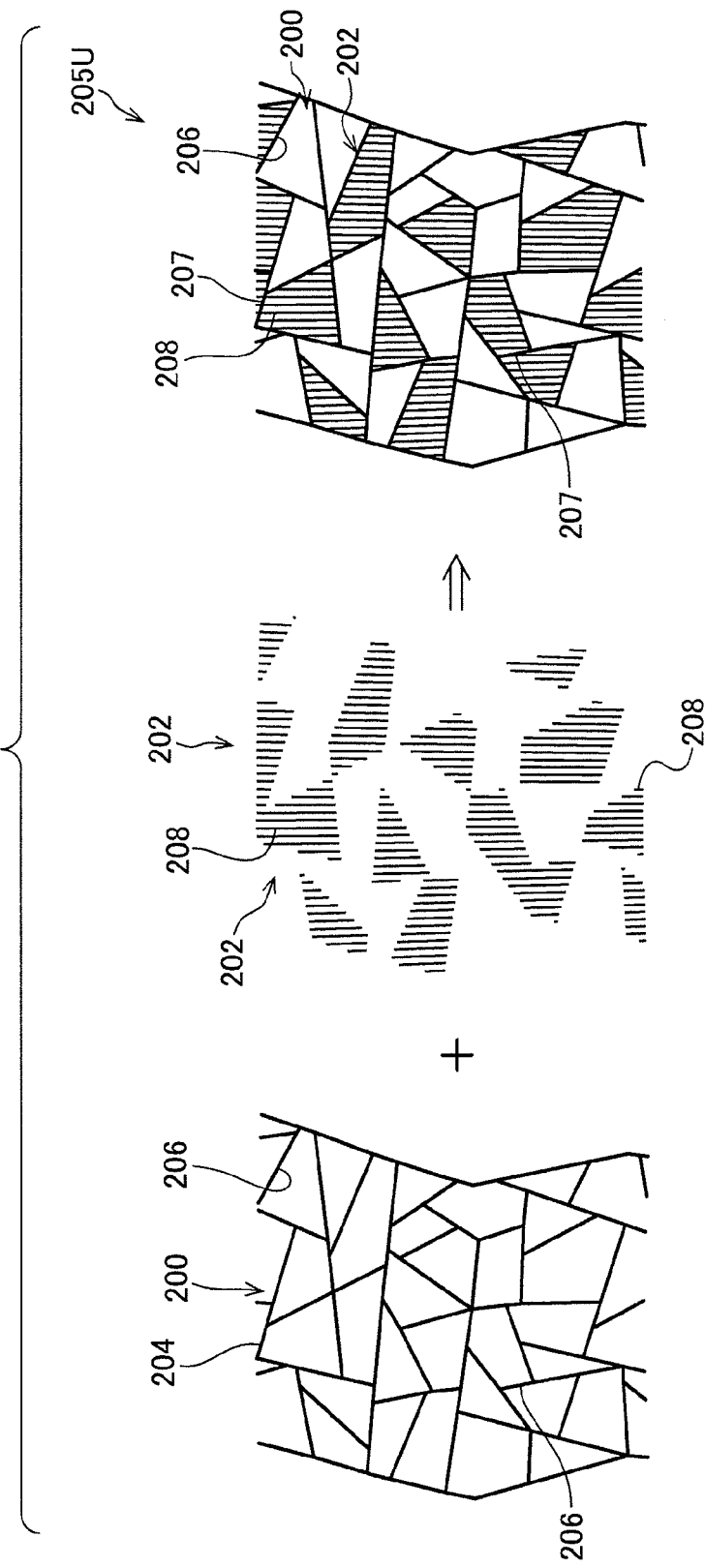

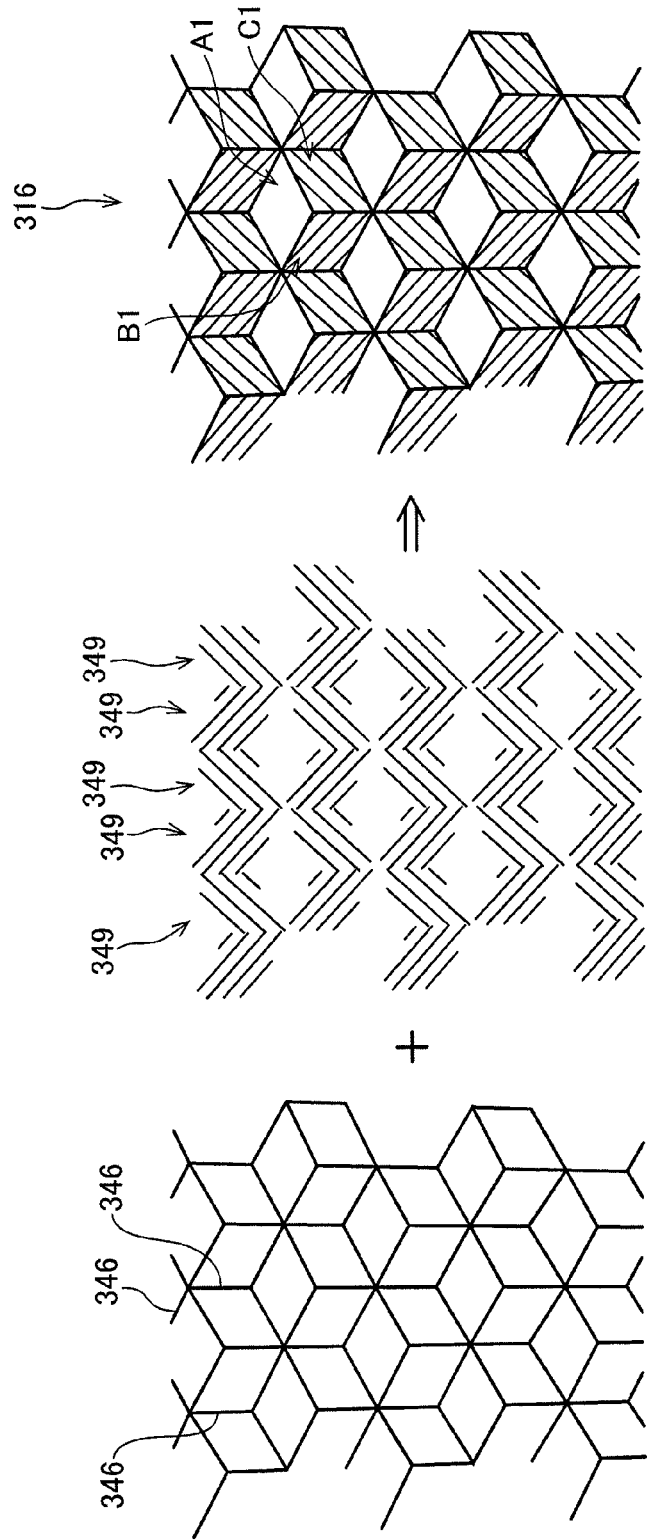

TIRE

CROSS REFERENCE TO RELATED APPLICATIONS

This application is a National Stage of International Application No. PCT/JP2010/070612 filed Nov. 18, 2010, claiming priority based on Japanese Patent Application Nos. 2009-264285 filed Nov. 19, 2009, JP 2009-284269 filed Dec. 15, 2009 and JP2010-009319 filed Jan. 19, 2010 the contents of all of which are incorporated herein by reference in their entirety.

TECHNICAL FIELD

The present invention relates to a tire provided with a decoration portion at a tire side portion.

BACKGROUND ART

Heretofore, the provision of side decoration bands in which plural straight or curved ridges are arranged in parallel at a side portion of a tire has become widespread.

For example, in the Specification of U.S. Pat. No. 5,807,446, an example is disclosed in which a second ridge is formed inside a first ridge to form a side decoration band. Further, in Japanese Patent Application Laid-Open (JP-A) No. 2008-273505, an example is disclosed in which a side decoration band is formed that includes a first decoration element, which is formed only by first ridges, and a second decoration element, in which second ridges are disposed inside the first ridges.

SUMMARY OF INVENTION

Technical Problem

Although an effect of making unevenness at the side portion of a tire less obvious is provided in the Specification of U.S. Pat. No. 5,807,446, there is little variation in silhouettes depending on directions in which light arrives, and there is only a weak impact on a person looking at the tire. In JP-A No. 2008-273505, an effect of differentiating reflection states of light by combinations of decoration elements A and B and improving external appearance is provided. However, variations in strength of light and shade in accordance with variations in the ridge heights are weak.

In consideration of the above circumstances, an object of the present invention is to provide a tire with which unevenness at a side portion is made less obvious and external appearance of the side portion is further improved.

Solution to Problem

A first aspect of the tire includes: a decoration portion at a tire side portion, the decoration portion including: decoration elements that include ridges; and depressions that are inclined with respect to a tire circumferential direction, that divide the decoration elements into two or more regions, and that make the ridges non-continuous in the tire circumferential direction, wherein the ridges include; first ridges; and second ridges that are smaller than the first ridges in at least one of height or width, and wherein at least a portion of the first ridges are inclined with respect to the tire circumferential direction and are adjacent to one another, and the depressions are formed between the adjacent first ridges.

The tire will usually be a pneumatic tire but may be a solid tire that is not filled with air. Some of the first ridges may each constitute decoration elements at both sides of the first ridge. The decoration portion is not limited to the tire side portion and may be provided as far as a shoulder portion or a bead portion or the like, provided such are at the tire side face.

In the tire of the first aspect, because the decoration portion with the ridges is provided at the tire side portion, unevenness of regions of the tire at which the decoration portion is provided may be made less obvious. Because the ridges formed at the decoration portion include the first ridges and the second ridges, of which at least one of the height and width is smaller than that of the first ridges, differences between the presence and absence of light reflections and between brightnesses (the light and shade of shadows) may be effectively exhibited. Thus, a pneumatic tire may be formed in which the appearance (aesthetics) of the tire side face is significantly improved.

In the first aspect, continuity in the tire circumferential direction of the ridges constituting the decoration elements is assuredly prevented by the gullies. Therefore, even when a force spreading in the tire radial direction acts on the tire side portion, cracks are unlikely to occur at the decoration portion formed at the tire side portion.

Of the plural types of ridge, the first ridges are adjacent to one another and the gullies are formed therebetween. Therefore, there is no need to make floor portions of the gullies lower than portions at which the ridges are not formed. Thus, the strength of regions of the tire at which the gullies are formed is significantly improved.

In a second aspect of the tire, the decoration elements include: first decoration elements, outer edge portions of which are formed by the first ridges, inner sides of the outer edge portions being smooth surfaces; and second decoration elements, outer edge portions of which are formed by the first ridges, the second ridges being arrayed at the inner side of the outer edge portions.

In the tire of the second aspect, because the inner side of the outer edge portion of each first decoration element is a smooth surface, the appearance of the first decoration element is unlikely to deteriorate even if some amount of soiling such as dirt adheres. Further, because the inner side of the outer edge portion of the first decoration element is the smooth surface, its reflectance of light is high and reflection angles are consistent, and silhouettes against the second decoration elements are effectively made visible.

In a third aspect of the tire, the second decoration elements are configured as at least two types, respectively having different directions of the second ridges.

Thus, at the second decoration elements, reflection directions of the light from the side wall faces of the second ridges are in at least two directions, and silhouettes are made visible from at least two directions.

In a fourth aspect of the tire, decoration element rows are formed by the first decoration elements and the second declaration elements being arranged alternately along the depressions, and the depressions are continuous along the decoration element rows between adjacent of the decoration element rows.

Thus, the appearance of the gullies is better than if the gullies are not continuous. Even though continuous gullies are formed, cracks are unlikely to to occur at the gully floors.

In a fifth aspect of the tire, a direction in which the depressions extend forms an angle with respect to the tire circumferential direction in a range of from 20° to 90°.

The above angle may be either of an angle to the rightward side relative to the tire circumferential direction and an angle to the leftward side.

If this angle is less than 20°, tensile stresses at the gully floors and ridge edges when a force spreading in the tire radial direction acts on the tire side portion are likely to be larger.

With a view to suppressing tensile stresses at the gully floors and ridge edges when a force spreading in the tire radial direction acts on the tire side portion, it is more preferable if this angle is 70° or less.

In a sixth aspect of the tire, a floor width of the depressions is from 0.2 mm to less than a maximum width of the decoration elements.

If the gully floor width is less than 0.2 mm, cracks are more likely to occur at the gully floors. If the gully floor width is greater than the greatest width of the decoration element, the appearance of the decoration portion is likely to deteriorate.

In a seventh aspect of the tire, a height of the decoration elements is from 0.1 mm to less than 0.3 mm.

If the height is less than 0.1 mm, the visibility of the decoration elements is likely to decrease. If the height is 0.3 mm or greater, it may be difficult to thoroughly prevent occurrences of cracks at the decoration portion.

An eighth aspect of the tire is a pneumatic tire that includes, at a tire side portion, a marked portion and a decoration portion, the decoration portion being configured by a combination of a plurality of types of decoration element, and the plurality of types of decoration elements, including: first decoration elements that are formed only by first ridges forming decoration element outlines; and second decoration elements including the first ridges forming decoration element outlines, and second ridges that are arranged in regions demarcated by the first ridges and that are lower in height than the first ridges.

In the tire of the eighth aspect, where the decoration elements are adjacent to one another, the decoration elements may share portions of the first ridges. The decoration portion is not limited to the tire side portion and may be provided as far as a shoulder portion or a bead portion or the like, provided such are at the tire side face. The tire will usually be a pneumatic tire but may be a solid tire that is not filled with air.

In the tire of the eighth aspect, because the decoration portion including the first decoration elements and the second decoration elements is provided at the tire side portion, unevenness of regions of the tire at which the decoration portion is provided may be made less obvious. Because the second ridges whose heights are lower than the first ridges are disposed at the second decoration elements, differences between the presence and absence of light reflections and between brightnesses (the light and shade of shadows) may be effectively exhibited. Thus, a pneumatic tire may be formed in which the appearance (aesthetics) of the tire side face is significantly improved.

In a ninth aspect of the tire, in the first decoration elements, interiors of regions surrounded by the first ridges are smooth surfaces.

Thus, at a region inside the first ridges constituting each first decoration element, the reflectance of light is high and reflection angles are consistent, and silhouettes against the second decoration elements are effectively made visible.

In a tenth aspect of the tire, inclination angles of side walls differ between the first ridges and the second ridges.

Thus, because the reflection directions differ between the inclined faces of the first ridges and the inclined faces of the second ridges, the first ridges and second ridges may be clearly distinguished by sight.

In an eleventh aspect of the tire, the first decoration elements and second decoration elements are arranged cyclically in the decoration portion.

Thus, an effect of uniformity and regularity being apparent is further provided.

In a twelfth aspect of the tire, the first ridges are configured by a plurality of linear ridges of arbitrary direction.

Thus, even with a simple structure in which positions of arrangement of the first decoration elements and the second decoration elements are not periodically aligned, because the first ridges have greater heights than the second ridges, a pneumatic tire whose appearance is significantly improved may be formed.

In a thirteenth aspect of the tire, the first decoration elements and the second decoration elements are disposed in at least a portion of a periphery of the marked portion.

Thus, the visibility of the marked portion is improved, which is to say, the visibility of marks is improved.

In a fourteenth aspect of the tire, the ridges are arrayed in a peripheral region of the marked portion that does not include any marks, and the marks are presented as smooth surfaces.

Thus, the visibility of the marks is further improved and the impact on a person viewing the marks is substantial. It is preferable, with a view to making marks for which the importance of visibility is high more prominent, that two or more decoration portions be formed at the tire side portion and that the decoration portions be disposed at both sides of a marked portion in the tire circumferential direction.

A fifteenth aspect of the tire includes a decoration portion at a tire side portion, the decoration portion including a plurality of decoration elements, and the decoration elements including: first decoration elements that are formed only by first ridges forming decoration element outlines; second decoration elements that are configured by the first ridges and second ridges that are arranged inside the first ridges; and third decoration elements that differ from the second decoration elements in terms of arrangement of the second ridges.

In the tire of the fifteenth aspect, where the first to third decoration elements are adjacent to one another, the first to third decoration elements may form plural combinations, even if the decoration elements share portions of the first ridges with one another.

In the tire of the fifteenth aspect, because the decoration portion formed of plural combinations of the first to third decoration elements is provided at the tire side portion, unevenness of regions of the tire at which the decoration portion is provided may be made less obvious. Because the arrangements of the second ridges differ between the second decoration elements and the third decoration elements, differences between shadows due to differences in the ways light (sunlight, environmental light, etc.) is reflected may be effectively exhibited. Thus, a tire may be formed in which the appearance (aesthetics) of the tire side portion is significantly improved.

In a sixteenth aspect of the tire, in the first decoration elements, regions inside the first ridges are smooth surfaces.

Thus, at regions inside the first ridges constituting the first decoration elements, the reflectance of light is high and reflection angles are consistent, and silhouettes against the second decoration elements and the third decoration elements are effectively made visible.

In a seventeenth aspect of the tire, directions of extension of the second ridges differ between the second decoration elements and the third decoration elements.

Thus, differences in brightness (light and shade of shadows) due to differences in the reflection directions of light may be effectively exhibited between the second decoration elements and the third decoration elements.

In an eighteenth aspect of the tire, pitches of the second ridges differ between the second decoration elements and the third decoration elements.

Thus, differences in shadows due to the difference in pitch between the second decoration elements and the third decoration elements may be effectively exhibited. This is particularly effective for making brightness differences between the second decoration elements and the third decoration elements sufficiently visible when incident amounts of light on the tire side portion are small.

In a nineteenth aspect of the tire, the first decoration elements, the second decoration elements and the third decoration elements are arranged cyclically in the decoration portion.

Thus, uniformity and regularity of the decoration portion are apparent, and unevenness of regions in which the declaration portion is formed may be made less obvious.

A twentieth aspect of the tire further includes a marked portion at the tire side portion that displays marks, wherein the first decoration elements and the second decoration elements are disposed in at least a portion of a periphery of the marked portion.

Thus, the visibility of the marked portion is improved, which is to say, the visibility of marks is improved.

In a twenty-first aspect of the tire, the ridges are arrayed in a a periphery region of the marked portion that does not include the marks, and the marks are presented as smooth surfaces.

Thus, the visibility of the marks is further improved and the impact on a person viewing the marks is substantial. It is preferable, with a view to making marks for which the importance of visibility is high more prominent, that two or more decoration portions be formed and that the decoration portions be disposed at both sides of the marked portion in the tire circumferential direction.

Advantageous Effects of Invention

According to the present invention, a tire with which unevenness at a side portion is made less obvious and appearance of the side portion is further improved may be formed.

BRIEF DESCRIPTION OF DRAWINGS

FIG. 17 is a descriptive diagram of a concept of arrangement of the first decoration elements and the second decoration elements in the fifth exemplary embodiment.

FIG. 23 is a descriptive diagram of a concept of arrangement of first decoration elements and second decoration elements in the eighth exemplary embodiment.

BEST MODE FOR CARRYING OUT THE INVENTION

Figure 1:
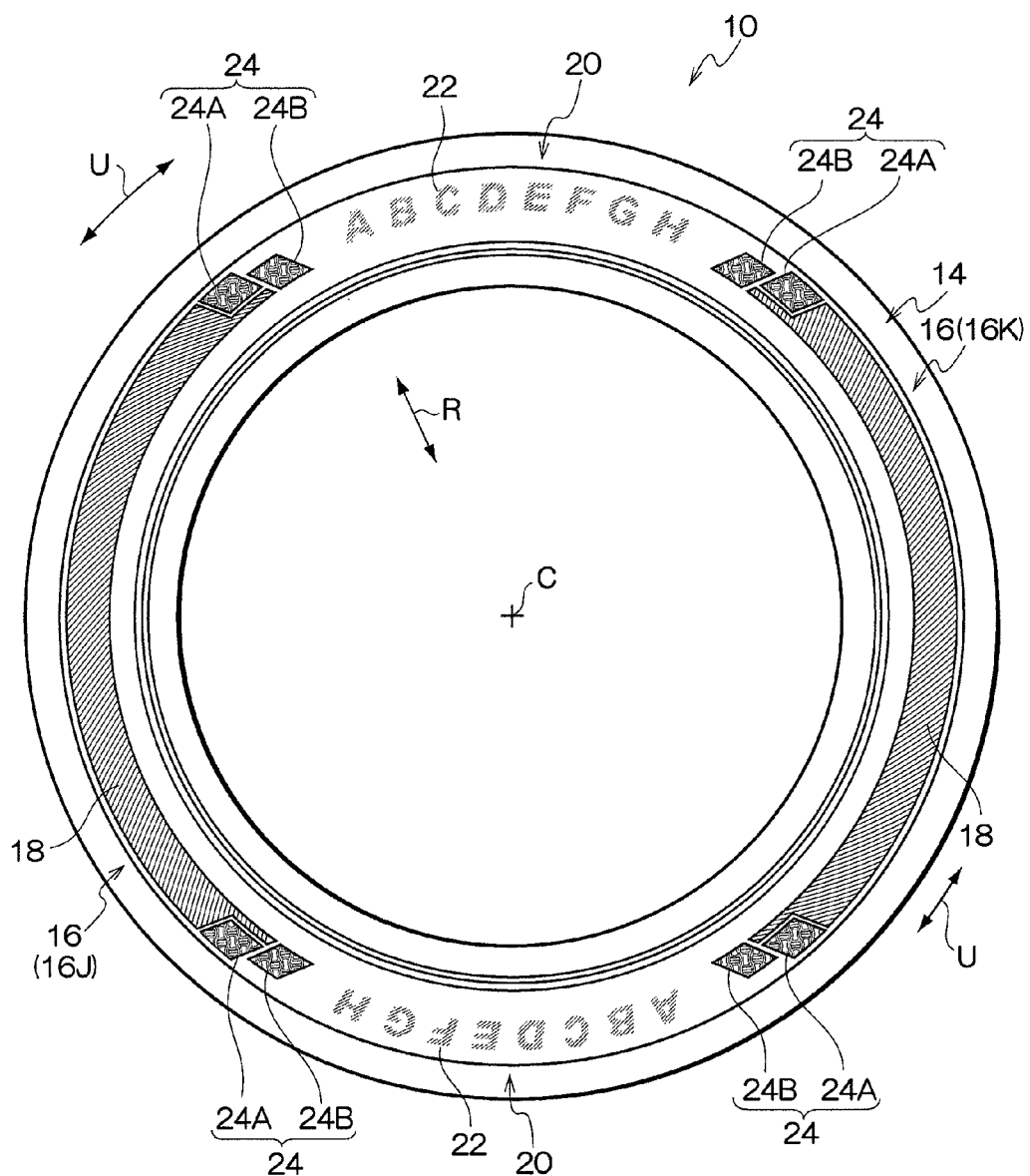
FIG. 1 is a side view of the vehicle outer side of a pneumatic tire in accordance with a first exemplary embodiment.
Figure 2:
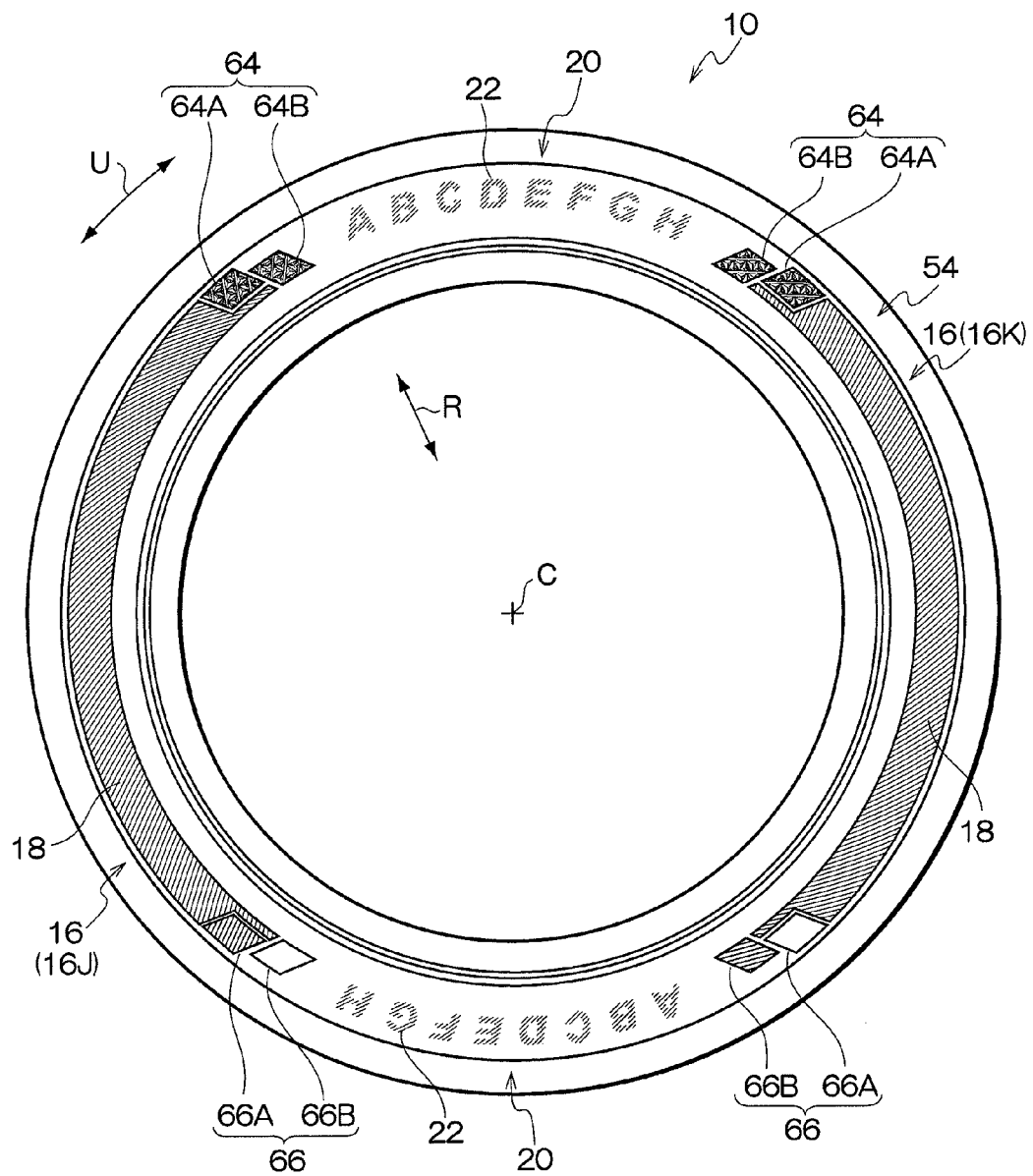
FIG. 2 is a side view of the vehicle inner side of the pneumatic tire in accordance with the first exemplary embodiment.

Herebelow, embodiments are presented and explained as exemplary embodiments of the present invention. FIG. 1 is a side view of the vehicle outer side of a pneumatic tire 10 in accordance with a present exemplary embodiment. FIG. 2 is a side view of the vehicle inner side of the pneumatic tire 10 in accordance with the present exemplary embodiment.

—Vehicle Outer Side of Pneumatic Tire—

As illustrated in FIG. 1, two side decoration bands 16 in circular arc shapes are formed at a side portion 14 at the vehicle outer side of the pneumatic tire 10. The two side decoration bands 16 are formed so as to be disposed at symmetrical positions sandwiching a tire central axis C (see FIG. 1). Numerous ridges 18 that are inclined with respect to a tire circumferential direction U are arrayed in each side decoration band 16.

t the side portion 14, marked portions 20 are formed in circular arc shapes between one side decoration band 16J and the other side decoration band 16K. Thus, two of the marked portions 20 are formed so as to be disposed at symmetrical positions sandwiching the tire central axis C. Marks 22 are displayed as, for example, the characters "ABCDEFGH", which are presented as smooth surfaces.

Decoration portions 24 are formed between the side decoration bands 16 and the marked portions 20. Thus, the decoration portions 24 are formed at four locations.

—The Decoration Portion 24—

Each decoration portion 24 is constituted by two decoration half-portions 24A and 24B that are adjacent to one another in the tire circumferential direction U. The decoration half-portions 24A and 24B are both formed in parallelogram shapes, the decoration half-portion 24A is disposed a little to the tire outer periphery side and the decoration half-portion 24B is disposed a little to the tire inner periphery side.

Figure 3:
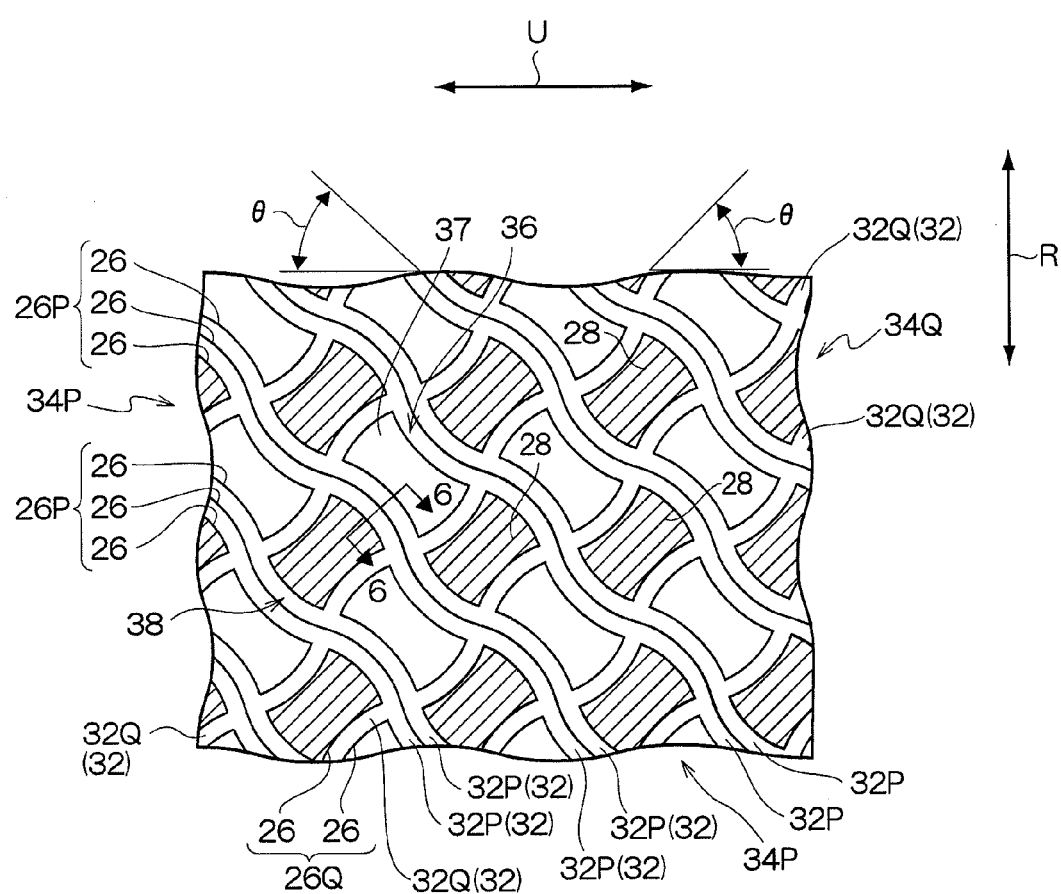
FIG. 3 is a partial enlarged view of a decoration portion formed at a side portion of the pneumatic tire in accordance with the first exemplary embodiment.

As illustrated in FIG. 3, first ridges 26, second ridges 28 and gullies 32 are formed at each of the decoration half-portions 24A and 24B. The first ridges 26 extend in directions angled at an inclination angle θ of around 45° with respect to the tire circumferential direction U. The second ridges 28 are smaller than the first ridges 26 in one or both of height and width. The gullies 32 extend in directions that are inclined with respect to the tire circumferential direction U. Each gully 32 is formed by and between first ridges 26 that are adjacent to one another. The gullies 32 divide decoration elements that form each decoration half-portion 24A into plural regions, and the same applies at the decoration half-portion 24B.

Giving a detailed description, triplet first ridges 26P and doublet first ridges 26Q are formed at the decoration half-portions 24A and 24B. The triplet first ridges 26P have three wave shapes extending in parallel from the lower right to the upper left of the drawing of FIG. 3 (that is, in a direction that is inclined from the tire radial direction inner side toward the outer side relative to the tire circumferential direction U in a tire side view). The doublet first ridges 26Q have two wave shapes extending in parallel from the lower left of the drawing toward the upper right. The respective ridges constituting the triplet first ridges 26P and doublet first ridges 26Q are all constituted by the first ridges 26. Gullies 32P with pairs of wave shapes extending at angles relative to the tire circumferential direction U are formed by the triplet first ridges 26P, and gullies 32Q with single wave shapes extending at angles relative to the tire circumferential direction U are formed by the doublet first ridges 26Q. The gullies 32P are continuous from one end to the other end of each of the decoration half-portions 24A and 24B.

The triplet first ridges 26P are plurally arrayed at equal intervals, and the doublet first ridges 26Q are plurally arrayed at equal intervals. Decoration element rows 34P are formed between adjacent triplet first ridges 26P along the triplet first ridges 26P (that is, along the gullies 32P). In each decoration element row 34P, first decoration elements 36 and second decoration elements 38 are alternately arrayed.

Each first decoration element 36 is a decoration element whose outer edge portions are formed by the first ridges 26 and at the inside of the outer edge portions of which a smooth surface 37 is formed. Each second decoration element 38 is a decoration element whose outer edge portions are formed by the first ridges 26 and at the inside of the outer edge portions of which a plural number of the second ridges 28 are arrayed parallel to one another. The second ridges 28 are ridges that extend in straight lines from the lower left toward the upper right of the drawing.

Decoration element rows 34Q are formed between adjacent doublet first ridges 26Q along the doublet first ridges 26Q (that is, along the gullies 32Q). In each decoration element row 34Q too, positions of the above-mentioned smooth surfaces 37 and second ridges 28 are set in a staggered pattern such that the first decoration elements 36 and second decoration elements 38 are alternately arrayed.

—Example of Favorable Dimensions—

Figure 6:
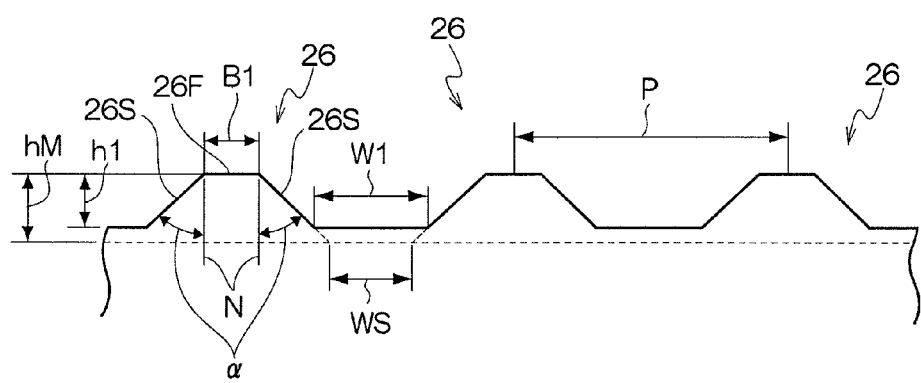
FIG. 6 is a sectional diagram showing first ridges constituting the decoration portion of the side portion of the pneumatic tire in accordance with the first exemplary embodiment.

Below, a specific favorable example of the first ridges 26 and second ridges 28 at the pneumatic tire 10 relating to the present exemplary embodiment, and spacings thereof and suchlike, is illustrated. FIG. 6 is a sectional diagram viewed from line 6-6 of FIG. 3.

As illustrated in FIG. 6, each first ridge 26 has a trapezoid shape in cross-section. A width B1 of a flat surface 26F forming a top portion of the first ridge 26 is a maximum of 0.2 mm. Inclined faces (side faces) 26S of the first ridge 26 form angles α of 45° with respect to a normal direction N of the side decoration band 16. A height h1 of the first ridge 26 is 0.2 mm. A spacing (pitch) P between adjacent first ridges is 1.0 mm, and a floor width W1 between the adjacent first ridges 26 is 0.4 mm. With this specification, given a machining crossover of 0.5 mm for a first recess portion 44 that forms the first ridges 26, which is described later, even at a minimum the floor width WS is 0.3 mm (a maximum height hM of the first ridge 26 in this case is 0.25 mm). If the floor width W1 is more than 0.2 mm, a structure in which cracks are unlikely to occur at the floor portions of the gullies 32 may be formed. Thus, the occurrence of cracks may be thoroughly prevented with this dimensional example.

Each second ridge 28 is also a trapezoid in cross-section. A structure may be formed in which the second ridges 28 have a lower height than the first ridges 26 or the width of the flat surface forming the top portion of each second ridge 28 is narrower than that of each first ridge 26. Further, a structure may be formed in which both the second ridges 28 have a lower height than the first ridges 26 and the widths of the flat surfaces forming the top portions of the second ridges 28 are narrower than those of the first ridges 26.

Favorable dimensional ranges of the first decoration element 36 and the second decoration element 38 are lengths in the tire circumferential direction being in a range from 2 mm to 10 mm, and lengths in the tire radial direction being in a range from 2 mm to 10 mm. It is preferable if the pitch of the second ridges 28 is at least 0.5 mm with a view to preventing the occurrence of cracks between adjacent second ridges 28, and it is preferable if the pitch is at most 1.5 mm with a view to appearance.

The first ridges 26 and second ridges 28 may be formed during vulcanization molding by recess portions being formed in advance at inner wall faces of a mold for vulcanization molding of a green tire.

Figure 7A:
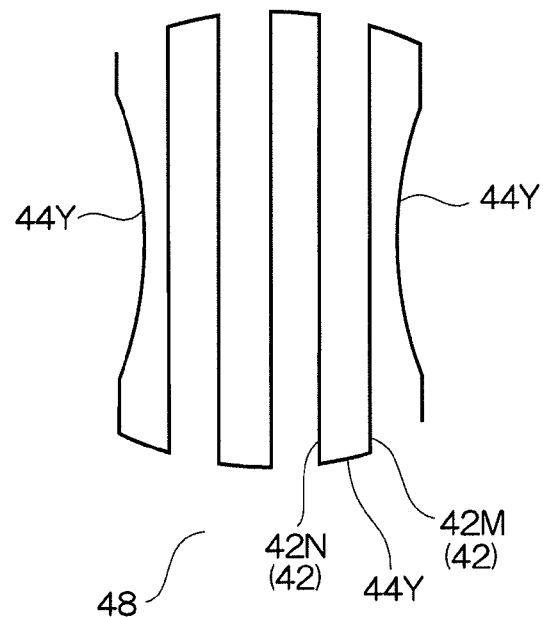
FIG. 7A is a descriptive diagram of a process step, illustrating the formation of recess portions that correspond with the first ridges and second ridges in a mold that fabricates the pneumatic tire in accordance with the first exemplary embodiment.
Figure 7B:
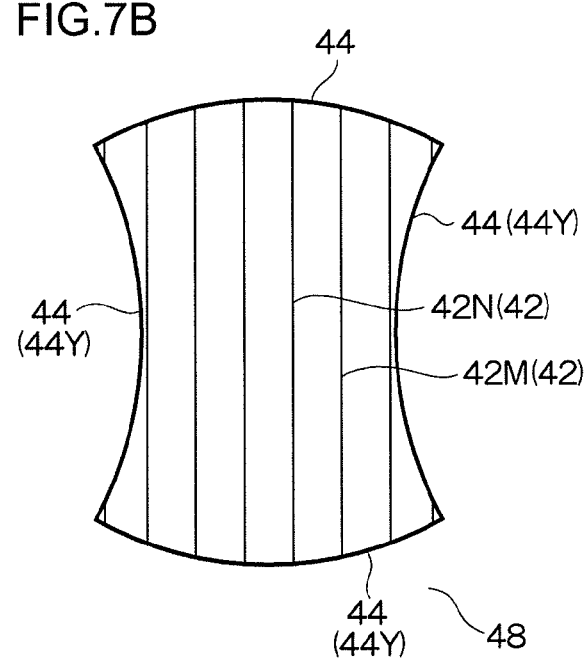
FIG. 7B is a descriptive diagram of a process step, illustrating the formation of the recess portions that correspond with the first ridges and the second ridges in the mold that fabricates the pneumatic tire in accordance with the first exemplary embodiment.

In the present exemplary embodiment, as illustrated in FIG. 7A and FIG. 7B, second recess portions 42 for forming the second ridges 28 are formed at mold inner wall portions 48 for forming the second decoration elements 38 (see FIG. 7A) and first recess portions 44 for forming the first ridges 26 are formed at the mold inner wall portions 48 (see FIG. 7B).

If there is a region in which the second recess portions 42 are non-continuous, and the first recess portions 44 are formed in the non-continuous region, a drill for forming the first ridges 26 is moved while cutting first recess portion preparatory portions 44Y. For example, one second recess portion 42M is formed by the drill, up to an end portion thereof, and then the drill is moved while cutting the first recess portion preparatory portions 44Y up to a position of an end portion of an adjacent second recess portion preparatory portion. Then the drill forms the adjacent second recess portion 42N.

After the second recess portions 42 have been formed with a single line as described above, the first recess portions 44 are formed by the drill. Hence, as illustrated in FIG. 7B, the first recess portions 44 are formed at the first recess portion preparatory portions 44Y, and no traces are left of the first recess portion preparatory portions 44Y that were cut by the drill cutting the second recess portions 42. Thus, the second recess portions 42 may be formed in a short time with a single line.

—Vehicle Inner Side of Pneumatic Tire—

As illustrated in FIG. 2, similarly to the side portion 14 at the vehicle outer side, two circular arc-shaped side decoration bands 16 and two circular arc-shaped marked portions 20 are formed at a side portion 54 at the vehicle inner side of the pneumatic tire 10.

Decoration portions 64 are formed between one side decoration band 16 and the marked portions 20. Thus, the decoration portion 64 is formed at each of two locations at the two tire circumferential direction end sides of the one side decoration band 16.

Decoration portions 66 are formed between the other side decoration band 16 and the marked portions 20. Thus, the decoration portion 66 is formed at each of two locations at the two tire circumferential direction end sides of the other side decoration band 16.

—The Decoration Portion 64—

Each decoration portion 64 is constituted by two decoration half-portions 64A and 64B that are adjacent to one another in the tire circumferential direction U. The decoration half-portions 64A and 64B both have outer shapes formed as parallelograms, the decoration half-portion 64A is disposed a little to the tire outer periphery side and the decoration half-portion 64B is disposed a little to the tire inner periphery side.

Figure 4A:
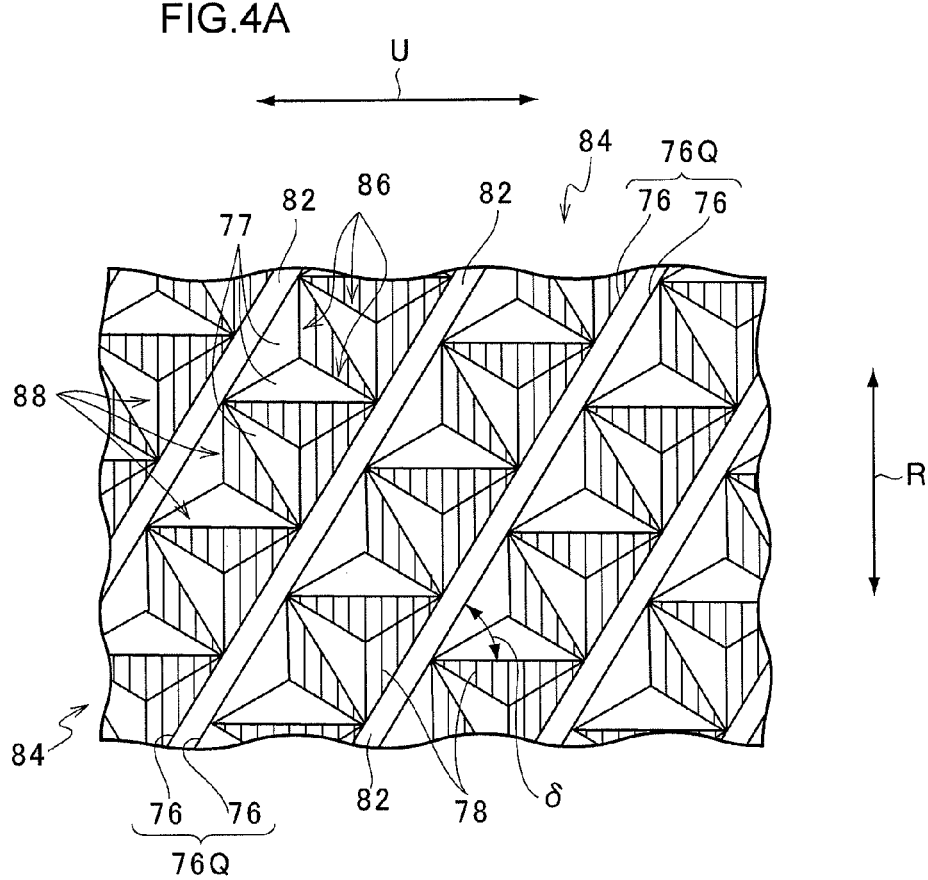
FIG. 4A is a partial enlarged view of a decoration portion formed at the side portion of the pneumatic tire in accordance with the first exemplary embodiment.

As illustrated in FIG. 4A, first ridges 76, second ridges 78 and gullies 82 are formed at both of the decoration half-portions 64A and 64B. The first ridges 76 extend in straight lines in directions that are inclined with respect to the tire circumferential direction U. The second ridges 78 are smaller than the first ridges 76 in one or both of height and width. The gullies 82 extend in directions that are inclined with respect to the tire circumferential direction U. Each gully 82 is formed by and between the first ridges 76. Each gully 82 is formed by and between the first ridges 76. The gullies 82 divide decoration elements that form the decoration half-portion 64A into plural regions, and the same applies at the decoration half-portion 64B.

Giving a detailed description, each first ridge 76 extends in a direction angled at an inclination angle $\delta$ of about 60° relative to the tire circumferential direction U. In the decoration half-portions 64A and 64B, doublet first ridges 76Q are formed, in each of which two ridges extend in parallel from the lower left to the upper right of the drawing of FIG. 4A. Each doublet first ridge 76Q is constituted by two of the first ridges 76. Between the parallel first ridges 76 constituting the doublet first ridges 76Q, the gullies 82 are formed extending at an angle with respect to the tire circumferential direction U. Each gully 82 is continuous from one end to the other end of the decoration half-portion 64A or 64B.

The doublet first ridges 76Q are plurally arrayed at equal intervals. Between adjacent doublet first ridges 76Q, decoration element rows 84 are formed along the gullies 82. In each decoration element row 84, first decoration elements 86 and second decoration elements 88 are alternately arrayed.

In the present exemplary embodiment, equilateral triangular shapes 92 that are protrusions to the radial direction outer side (hereinafter referred to as outward triangular shapes 92) and equilateral triangular shapes 94 that are protrusions to the radial direction inner side (hereinafter referred to as inward triangular shapes 94) are formed by the first decoration elements 86 and second decoration elements 88.

Each first decoration element 86 is formed by first ridges 76 that form outer edge portions of an isosceles triangle with an internal angle of 120°, and a smooth surface 77 with an isosceles triangle shape that is formed inside the first ridges 76. Each second decoration element 88 is formed by first ridges 76 that form outer edge portions of an isosceles triangle with an internal angle of 120°, and second ridges 78 that are arrayed inside the first ridges 76. In the present exemplary embodiment, the second ridges 78 extend in the tire radial direction R.

Figure 4B:
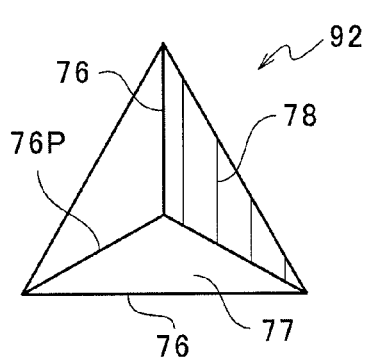
FIG. 4B is a partial enlarged view of the decoration portion formed at the side portion of the pneumatic tire in accordance with the first exemplary embodiment, being a view showing an outward triangular shape.

Each outward triangular shape 92 (see FIG. 4B) is constituted by two of the first decoration elements 86 that are adjacent to one another, and one of the second decoration elements 88. The two first decoration elements 86 share a first ridge 76P at the region at which they adjoin one another, and the first ridge 76P structures both of these first decoration elements 86.

Figure 4C:
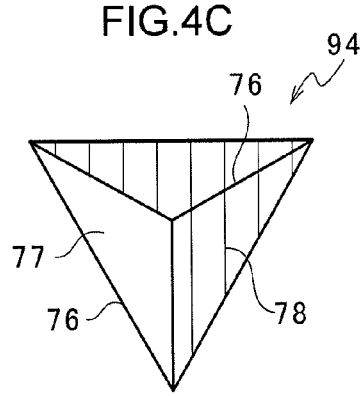
FIG. 4C is a partial enlarged view of the decoration portion formed at the side portion of the pneumatic tire in accordance with the first exemplary embodiment, being a view showing an inward triangular shape.

Each inward triangular shape 94 (see FIG. 4C) is constituted by one of the first decoration elements 86, and two of the second decoration elements 88. The two second decoration elements 88 share a first ridge 76P at the region at which they adjoin one another, and the first ridge 76P structures both of these second decoration elements 88.

The outward triangular shapes 92 and inward triangular shapes 94 are arrayed alternately along the gullies 82.

—The Decoration Portion 66—

Each decoration portion 66 is constituted by two decoration half-portions 66A and 66B that are adjacent to one another in the tire circumferential direction U. The decoration half-portions 66A and 66B both have outer shapes formed as parallelograms, the decoration half-portion 66A is disposed a little to the tire outer periphery side and the decoration half-portion 66B is disposed a little to the tire inner periphery side.

Figure 5:
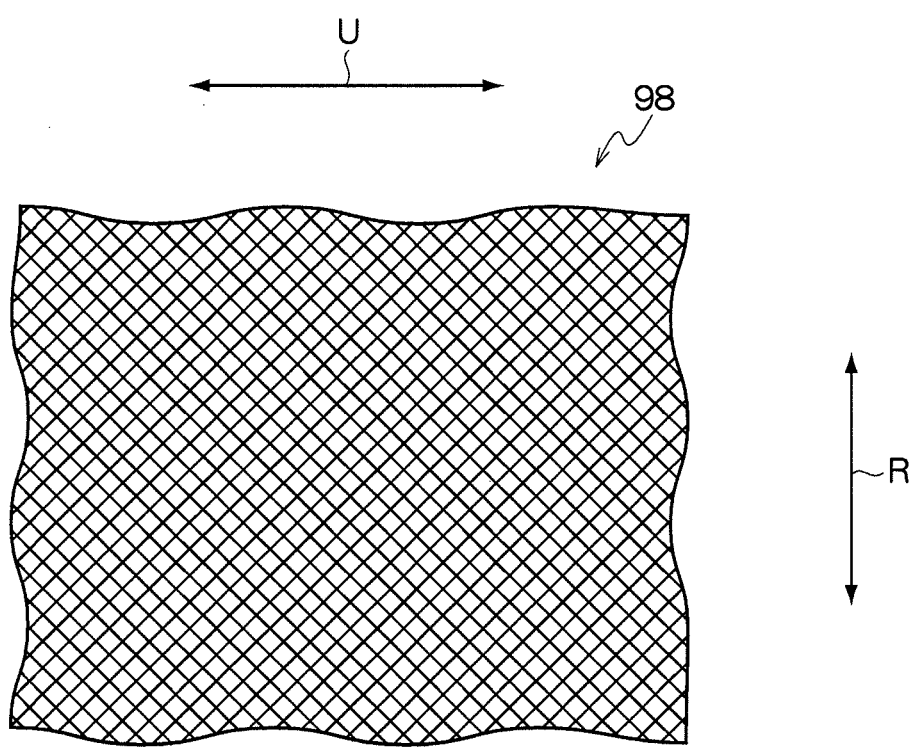
FIG. 5 is a partial enlarged view of a decoration portion formed at the side portion of the pneumatic tire in accordance with the first exemplary embodiment.

As illustrated in FIG. 5, lattice ridges 98 are formed in the decoration half-portions 66A and 66B by ridges that extend from the lower right to the upper left of the drawing and ridges that extend from the lower left to the upper right of the drawing.

As described hereabove, according to the present exemplary embodiment, the decoration portions 24 and 64 containing ridges are provided at the tire side portions. Thus, unevenness of the regions of the tire in which these decoration portions are provided may be made less obvious. The ridges formed in the decoration portion 24 include the first ridges 26 and the second ridges 28 of which at least one of the height and width is greater than that of the first ridges 26. The ridges formed in the decoration portion 64 include the first ridges 76 and the second ridges 78 of which at least one of the height and width is greater than that of the first ridges 76. Therefore, differences between the presence and absence of light reflections and between brightnesses (the light and shade of shadows) may be effectively exhibited. Thus, a pneumatic tire may be formed in which the appearance (aesthetics) of the tire side faces is significantly improved.

Furthermore, according to the present exemplary embodiment, the decoration portions 24 of the side portion 14 include the plural gullies 32 (32P and 32Q) that are inclined with respect to the tire circumferential direction U, and the first decoration elements 36 and second decoration elements 38 that are formed at both sides of each gully 32. Therefore, the first ridges 26 and second ridges 28 constituting the first decoration elements 36 and second decoration elements 38 are assuredly prevented from being continuous in the tire circumferential direction U by the gullies 32. Therefore, even when a force spreading in the tire radial direction (the tire diametric direction) R acts on the side portion 14, cracks are unlikely to occur at the decoration portions 24. This provides a particularly striking effect if there is a step at a rear face side of the side portion 14, due to folded ends of the carcass ply or the like, and the decoration portion 24 is disposed at a position straddling this step.

The first ridges 26 are inclined with respect to the tire circumferential direction U and are adjacent to one another, and the gullies 32 are formed between the adjacent first ridges 26. Therefore, there is no need for the floors of the gullies 32 to be set lower than smooth portions such as the smooth surfaces 37 and the like. In consequence, the strength of regions of the tire at which the gullies 32 are formed is sufficiently high.

Because the inner side of the outer edge portion of each first decoration element 36 is the smooth surface 37, the appearance of the first decoration element 36 is unlikely to deteriorate even if some amount of soiling such as dirt adheres. Further, the reflectance of light is raised by the smooth surface 37 and reflection angles are consistent, and silhouettes against the second decoration elements 38 are effectively made visible. Moreover, compared with forming ridges at the inside of each first decoration element 36, forming the smooth surfaces 37 may reduce the number of steps in machining of a mold and the like.

The decoration element rows 34P and 34Q are formed in each decoration portion 24. In each decoration element row 34P, the first decoration elements 36 and second decoration elements 38 are disposed alternately along the gullies 32P, and in each decoration element row 34Q, the first decoration elements 36 and second decoration elements 38 are disposed alternately along the gullies 32Q. The gullies 32 (32P and 32Q) extend so as to be continuous from end to end of the decoration element rows. Thus, the appearance of the gullies 32 is better than if the gullies were not continuous, and even though the continuous gullies 32 are formed, cracks are unlikely to occur in the gully floors.

Because each gully 32 forms an angle θ of around 45° with the tire circumferential direction U, even if a force spreading in the tire radial direction R or a force spreading in the tire circumferential direction U or the like acts on the side portion 14, tensile stresses at the floor portions of the gullies 32 and ridge floor edges (particularly ridge floor edges of the first ridges 26) or the like are thoroughly prevented from increasing. The angle θ is not limited to 45° and may be an angle in a range from 20° to 90°. Thus, tensile stresses at the floor portions and ridge edges of the gullies 32 or the like when a force spreading in the tire radial direction R acts on the side portion 14 may be effectively lowered. In regard to suppressing the tensile stresses occurring at the floor portions and ridge bottom edges of the gullies 32 or the like when a force spreading in the tire circumferential direction U acts on the side portion 14, it is preferable if the angle θ is not more than 70°.

At the decoration portions 64 at the vehicle inner side side portion 54 too, the plural gullies 82 are formed at angles with respect to the tire circumferential direction U, the first decoration elements 86 and second decoration elements 88 are formed between adjacent gullies 82, and similar effects are realized as at the decoration portions 24 at the vehicle inner side side portion 14.

It is preferable if floor widths of the gullies 32 are at least 0.2 mm but not more than a maximum width of the first decoration elements 36 and second decoration elements 38. Thus, a structure may be formed in which cracks are unlikely to occur at the floors of the gullies 32, without the appearance of the decoration portion 24 being adversely affected. The same applies to the gullies 82.

It is preferable if the heights of the first decoration elements 36 and second decoration elements 38, that is, the heights of the first ridges 26 and 76 and the second ridges 28 and 78, are at least 0.1 mm but less than 0.3 mm. Thus, occurrences of cracks in the decoration portions 24 may be thoroughly prevented without the appearance of the first decoration elements 36 and second decoration elements 38 being adversely affected. The same applies to the first decoration elements 86 and second decoration elements 88.

Figure 8:
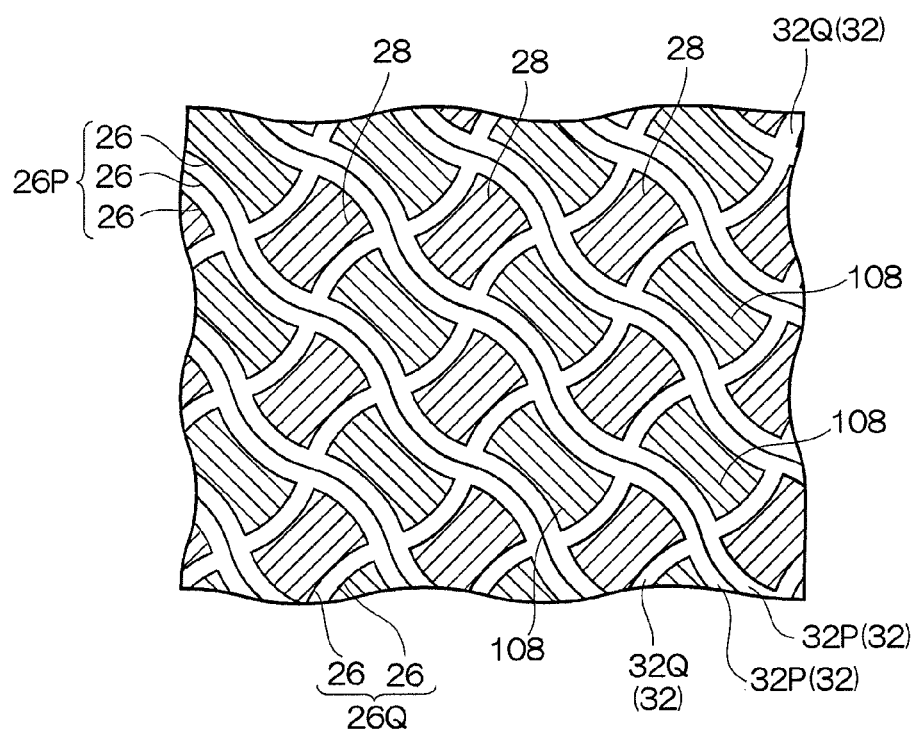
FIG. 8 is a partial enlarged view showing a variant example of the decoration portion formed at the side portion of the pneumatic tire in accordance with the first exemplary embodiment.

Further modes may be formed with ridges or the like instead of the smooth surfaces 37 and 77. For example, as illustrated in FIG. 8, second ridges 79 may be arrayed instead of the smooth surfaces 37 (see FIG. 3). In this case, the directions of the second ridges 79 are arranged so as to differ by 90° from the directions of the second ridges 28. Thus, light reflection directions from the second ridges 28 and the second ridges 79 are different by 90°. Consequently, the light and shade of shadows change in a regular manner depending on differences in viewing directions, and the appearance (aesthetics) of the tire side face is further improved.

In the present embodiment, an example is described in which the decoration portions 24 are formed at four locations of the side portion 14 at the vehicle outer side, and at the side portion 54 at the vehicle inner side, the decoration portions 64 are formed at both tire circumferential direction end sides of one of the side decoration bands 16 and the decoration portions 66 are formed at both tire circumferential direction end sides of the other side decoration band 16. However, the present invention is not limited thus. The decoration portions 24 and the decoration portions 64 may be disposed at the side portion 14 at the vehicle outer side, and the number of decoration portions may be a number greater or a number smaller than four.

—Second Exemplary Embodiment—

Figure 9:
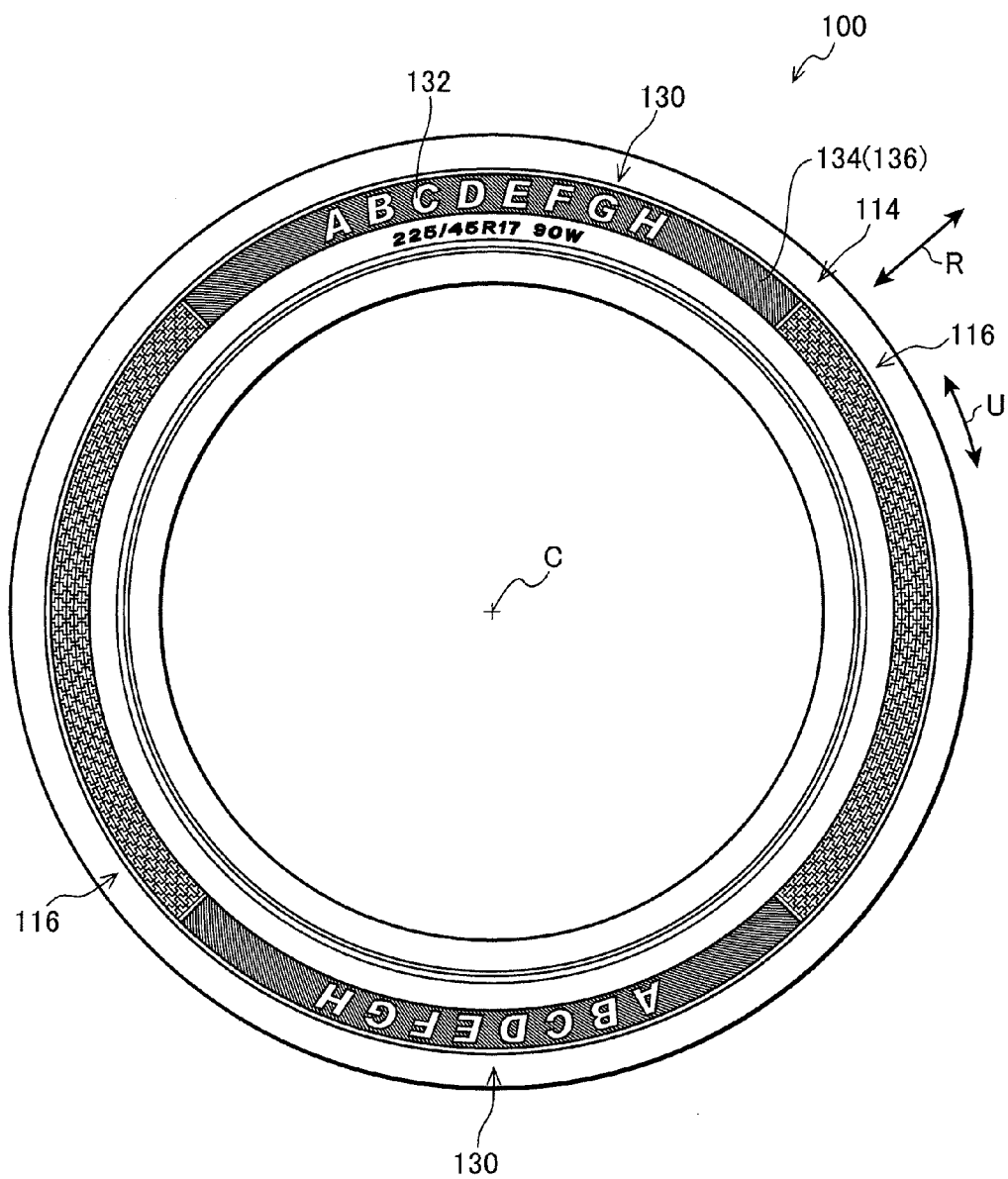
FIG. 9 is a side view of a pneumatic tire in accordance with a second exemplary embodiment.
Figure 10:
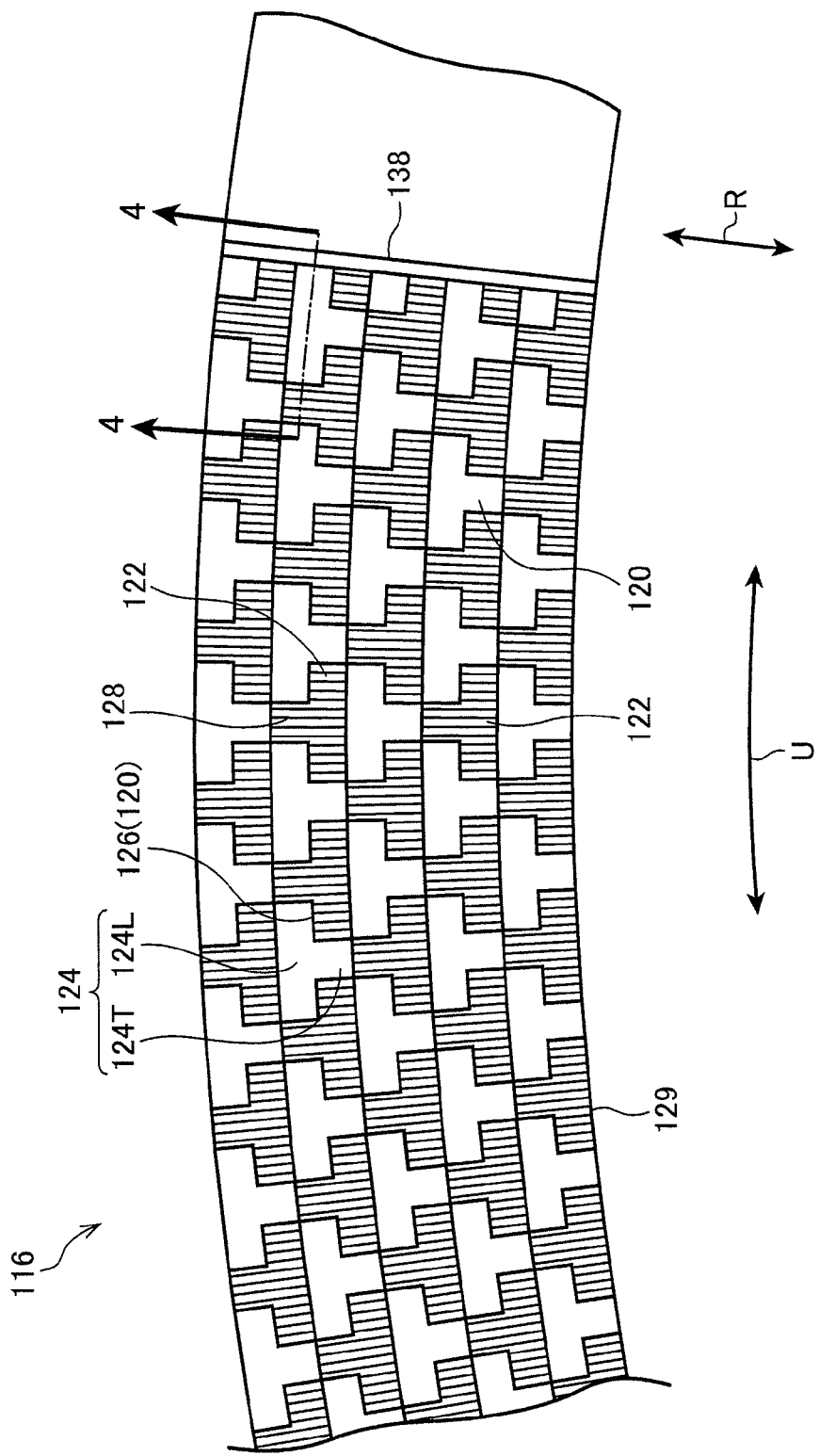
FIG. 10 is a partial enlarged side view of a side decoration band of the pneumatic tire in accordance with the second exemplary embodiment.

Next, a second exemplary embodiment is described. FIG. 9 is a side view of a pneumatic tire 100 in accordance with the present exemplary embodiment. As shown in FIG. 9 and FIG. 10, two side decoration bands 116 in circular arc shapes (see FIG. 9 and FIG. 10) are formed at a side portion 114 of the pneumatic tire 100. Each side decoration band 116 is formed by a combination of plural first decoration elements 120 and second decoration elements 122. The first decoration elements 120 are formed only by first ridges 126 that form an outline of a smooth surface region 124 with a specified shape. The second decoration elements 122 are constituted by the first ridges 126 that form outlines, and second ridges 128 that are arrayed inside the first ridges 126. The first decoration elements 120 and second decoration elements 122 that are adjacent to one another share the first ridges 126.

Two of the two side decoration bands 116 are formed so as to be disposed at symmetrical positions sandwiching the tire central axis C (see FIG. 9).

At the side portion 114, marked portions 130 are formed in circular arc shapes so as to be adjacent at respective both end portions thereof with one side decoration band 116 and the other side decoration band 116. Thus, two of the marked portions 130 are formed so as to be disposed at symmetrical positions sandwiching the tire central axis C. Marks 132 are displayed as, for example, the characters "ABCDEF", which are presented as smooth surfaces. Numerous ridges 134 are arrayed in surrounding regions 136 of the marked portions 130 excluding the marks 132.

Figure 11:
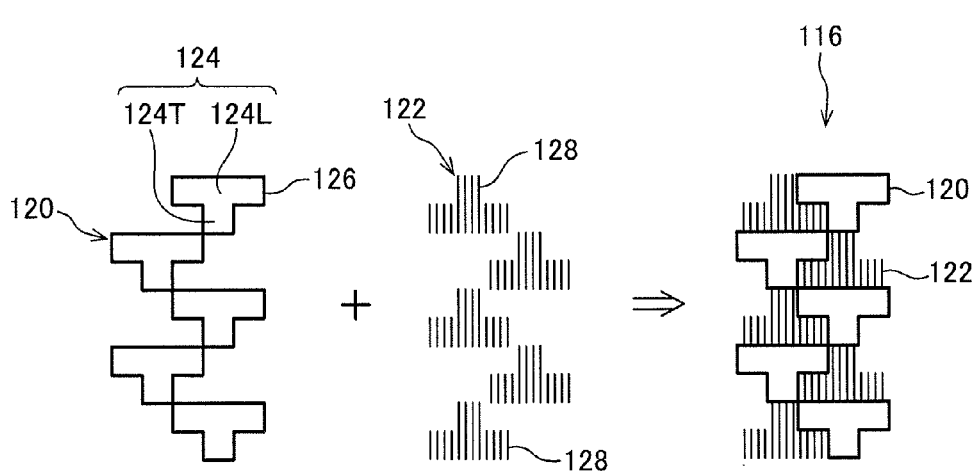
FIG. 11 is a descriptive diagram of a concept of arrangement of first decoration elements and second decoration elements in the second exemplary embodiment.

As shown in FIG. 10, in each side decoration band 116, the first decoration elements 120 and the second decoration elements 122 are arranged periodically. Giving a detailed description, in the side decoration band 116, the first decoration elements 120 and the second decoration elements 122 are arranged alternately in the tire circumferential direction U and in the tire radial direction (in a checkered pattern). The concept of arranging the first decoration elements 120 and the second decoration elements 122 alternately thus is described in FIG. 11. As shown in FIG. 11, in the present exemplary embodiment, positions of arrangement of the first decoration elements 120 and the second decoration elements 122 are offset.

Of each first decoration element 120, the smooth surface region 124 surrounded by the first ridges 126 is constituted by a long, narrow portion 124L, with a substantially rectangular shape that is long in the tire circumferential direction U, and an extending portion 124T, with a substantially square shape that extends toward the tire radial direction inner side from a tire circumferential direction central portion of the long, narrow portion 124L. Because the outline of the smooth surface region 124 is formed by the first ridges 126, the first decoration element 120 has a shape that appears as a "T" oriented to the tire radial direction inner side.

Each second decoration element 122 has a shape that appears as a "T" oriented to the tire radial direction outer side. The second ridges 128 constituting the second decoration element 122 are ridges extending in the tire radial direction R.

As described above, in the present exemplary embodiment the side decoration band 116, in which the first decoration elements 120 and the second decoration elements 122 are disposed alternately in the tire circumferential direction U and the tire radial direction R, is formed at the side portion 114. Each first decoration element 120 is formed only by the first ridges 126 that form the outline of the smooth surface region 124. Each second decoration element 122 is constituted by the second ridges 128 whose heights are lower than the first ridges 126 being arrayed. The first ridges 126 serve the function of framing the decoration pattern, and the second ridges 128 serve the function of improving visibility. In the side decoration band 116. because the first decoration elements 120 and the second decoration elements 122 are continuously formed alternately, unevenness of regions in which the side decoration band 116 is formed may be made less visible. Moreover, the presence and absence of light reflections and brightnesses (the light and shade of shadows) may be effectively exhibited. In addition, because a reflection direction from the smooth surface regions 124 is a single direction, glossy shades are distinct and a sense of high quality may be imparted, and the appearance (aesthetics) is improved. This is particularly striking if a wax is applied to the side decoration band 116. Because the first ridges 126 have greater heights than the second ridges 128, the appearance is significantly improved compared to a case in which the heights are the same. The dimensions of the first ridges 126 and the second ridges 128 may be made different by making the machining depths different when the ridges are being formed by tooling, etching or the like.

Because the first decoration elements 120 and the second decoration elements 122 have the same shapes apart from the orientations being opposite, the side decoration band 116 appears with uniformity and regularity, and a further effect of making unevenness of the side decoration band 116 less visible is obtained.

In each side decoration band 116, the first decoration elements 120 and the second decoration elements 122 are arranged periodically (arranged in a checkered pattern). Therefore, the appearance (aesthetics) is excellent. Contrasts in brightness occur clearly with the presence and absence of the second ridges 128 whose boundaries are the outlines formed by the first ridges 126, and visibility of the side decoration band 116 formed by the first decoration elements 120 and the second decoration elements 122 is further improved.

In the present exemplary embodiment, the pneumatic tire 100 is provided with the marked portions 130 at the tire side face. The marked portions 130 display the marks 132 and are adjacent with the first decoration elements 120 and the second decoration elements 122 at respective both ends thereof. Thus, the visibility of the marked portions 130 is improved, which is to say, visibility of the marks 132 is improved.

The marks 132 are displayed as smooth surfaces, and the ridges 134 (for example, straight or curved ridges) are arrayed in the surrounding regions 136 of the marked portions 130 excluding the marks 132. Thus, the visibility of the marks 132 is further improved and the impact on a person viewing the marks 132 is substantial.

In the present exemplary embodiment, the direction of extension of the second ridges 128 is the tire radial direction R, but the present invention is not limited thus and the direction may be a direction intersecting the tire radial direction R.

Figure 12:
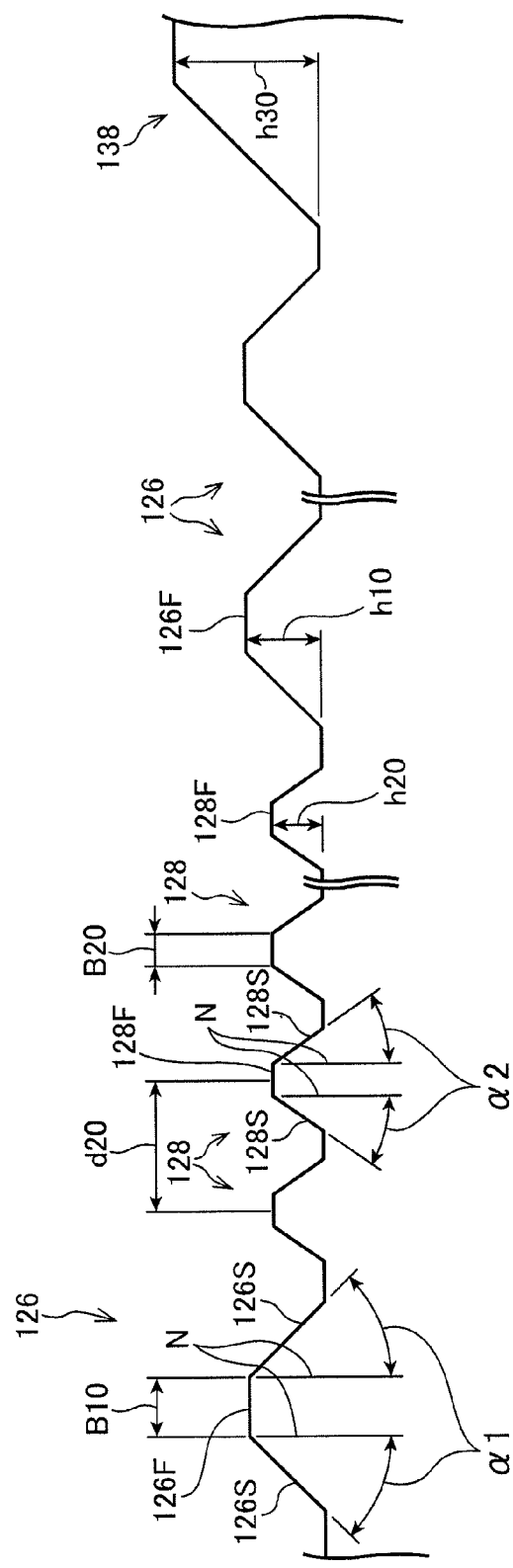
FIG. 12 is a sectional diagram viewed from line 4-4 of FIG. 10.

Below, a specific favorable example of the first ridges 126 and second ridges 128, and spacings thereof and suchlike, is illustrated. FIG. 12 is a sectional diagram viewed from line 4-4 of FIG. 10. As shown in FIG. 12, each first ridge 126 has a trapezoid shape in cross-section. A width B10 of a flat surface 126F forming a top portion of the first ridge 126 is a maximum of 0.2 mm. Inclined faces (side faces) 126S of the first ridge 126 form angles $\alpha 1$ of 45° with respect to a normal direction N of the side decoration band 116. A height h10 of the first ridge 126 is 0.2 mm. A height h30 of a dividing ridge 138 that extends in the tire radial direction R and divides the side decoration band 116 from the marked portions 130 is 0.4 mm.

Each second ridge 128 is also a trapezoid in cross-section. A width B20 of a flat surface 128F forming a top portion of the second ridge 128 is a maximum of 0.2 mm. Inclined faces (side faces) 128S of the second ridge 128 form angles α2 of 35° with respect to a normal direction N of the side decoration band 116. A height h20 of the second ridge 128 is 0.15 mm. A spacing d20 between adjacent second ridges 128 is 0.6 mm.

Thus, because the inclination angles of the inclined faces 126S of the first ridges 126 and the inclined faces 128S of the second ridges 128 are different (α1 and α2 are different), the function of framing the decoration patterns by the first ridges 126 and the function of improving visibility of the patterns by the second ridges 128 may be more clearly implemented. Because of the relationships h10>h20 and α1>α2, this is realized even further.

As long as the height h10 of the first ridges 126 is greater than the height h20 of the second ridges 128, sufficient effects of visibility, endurance and the like will be realized, provided these dimensions are within a range of ±50% of the values illustrated here, preferably within a range of ±30%.

—Third Exemplary Embodiment—

Figure 13:
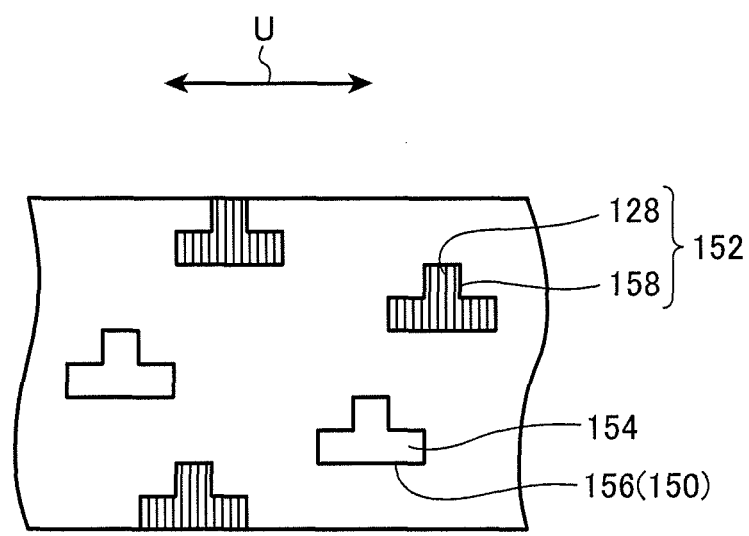
FIG. 13 is a partial enlarged side view of a side decoration band of a pneumatic tire in accordance with a third exemplary embodiment.

Next, a third exemplary embodiment is described. In the present exemplary embodiment, as shown in FIG. 13, first decoration elements 150 and second decoration elements 152 are respectively spaced apart and arranged in the side decoration band 116 of the side portion 114 of the pneumatic tire 100 shown in FIG. 9. Compared with the first decoration element 120 described in the second exemplary embodiment, each first decoration element 150 is inverted in the up-down direction of the drawing (the tire radial direction R), and has a first ridge 156, which has the same cross-sectional dimensions as the first ridges 126, formed surrounding a smooth surface region 154. Compared with the second decoration element 122 described in the second exemplary embodiment, each second decoration element 152 has a first ridge 158, which has the same cross-sectional dimensions as the first ridges 126, formed therearound. The second ridges 128 are arrayed inside the first ridge 158.

In the present exemplary embodiment, the first ridges 156 and 158 serve the function of framing the decoration pattern, and the second ridges 128 serve the function of improving visibility. Because of the second ridge patterns, differences between the presence and absence of light reflections and between brightnesses (the light and shade of shadows) may be effectively exhibited. In addition, because a reflection direction from the smooth surface regions 154 is a single direction, the appearance (aesthetics) may be improved.

—Fourth Exemplary Embodiment—

Figure 14A:
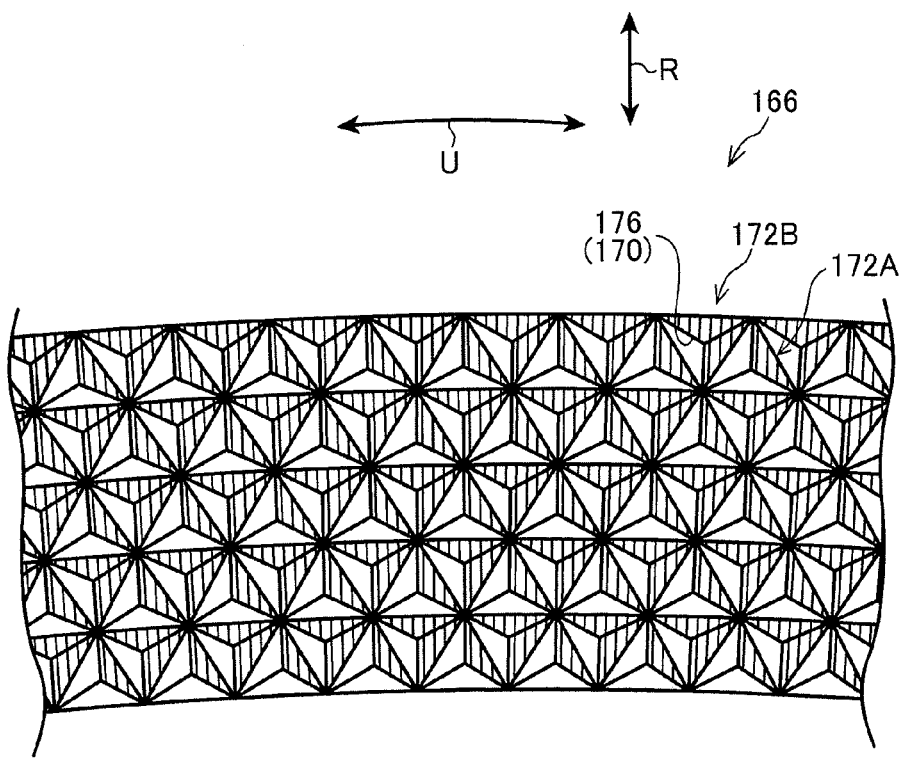
FIG. 14A is a partial enlarged side view of a side decoration band of a pneumatic tire in accordance with a fourth exemplary embodiment.
Figure 14B:
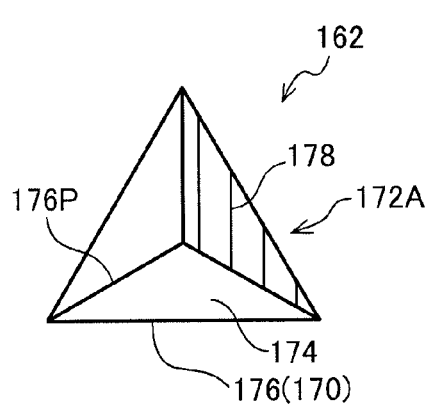
FIG. 14B is an enlarged view of a first principal portion in FIG. 14A.
Figure 14C:
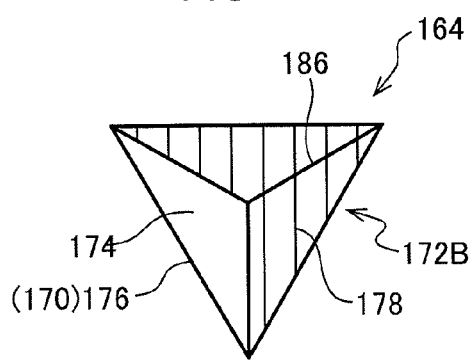
FIG. 14C is an enlarged view of a second principal portion in FIG. 14A.

Next, a fourth exemplary embodiment is described. In the present exemplary embodiment, as shown in FIG. 14A, a side decoration band 166 in a circular arc shape that is formed of a combination of plural first decoration elements 170 and second decoration elements 172 (second decoration elements 172A and 172B hereinafter) is formed at the side portion 114 of the pneumatic tire 100 shown in FIG. 9. Two of the side decoration bands 166 are formed so as to be disposed at symmetrical positions sandwiching the tire central axis. Similarly to the first exemplary embodiment, the marked portions 130 are formed in circular arc shapes at the side portion (see FIG. 9).

As shown in FIG. 14A to FIG. 14C and FIG. 15, in the present exemplary embodiment, equilateral triangular shapes 162 that are protrusions to the radial direction outer side (hereinafter referred to as outward triangular shapes 162) and equilateral triangular shapes 164 that are protrusions to the radial direction inner side (hereinafter referred to as inward triangular shapes 164) are formed by the first decoration elements and second decoration elements.

The first decoration elements 170 are formed only by first ridges 176 that form outlines of smooth surface regions 174 in the shape of isosceles triangles with an internal angle of 120°. The second decoration elements 172A are constituted by first ridges 176 that form outlines, and second ridges 178 that are arrayed inside the first ridges 176 and have smaller heights than the first ridges 176. In the present exemplary embodiment, the second ridges 178 extend in the tire radial direction R.

Each outward triangular shape 162 (see FIG. 14B) is constituted by two of the first decoration elements 170 that are adjacent to one another, and one of the second decoration elements 172A. In each outward triangular shape 162, the second decoration element 172A is formed in a region of the outward triangular shape 162 excluding the first decoration elements 170. Therefore, the shape of the second decoration element 172A is an isosceles triangle with the same dimensions as each first decoration element 170. The two first decoration elements 170 share a first ridge 176P at the region at which they adjoin one another, and the first ridge 176P structures both of these first decoration elements 170.

Each inward triangular shape 164 (see FIG. 14C) is constituted by one of the first decoration elements 170 and one of the second decoration elements 172B. In each inward triangular shape 164, the second decoration element 172B is formed in a region of the inward triangular shape 164 excluding the first decoration element 170. The second ridges 178 with smaller heights than the first ridges 176 are arrayed in the second decoration element 172B. In the present exemplary embodiment, a dividing ridge 186 that divides the region in which the second ridges 178 is formed in two is formed in the second decoration element 172B, extending in a straight line from the center of the inward triangular shape 164 (that is, a vertex of the isosceles triangle formed by the first decoration element 170). Cross-sectional dimensions of the dividing ridge 186 are the same as the first ridges 176. Therefore, in appearance, the second decoration element 172B looks like two of the second decoration elements 172A that constitute the outward triangular shape 162 adjacent to one another.

Figure 15:
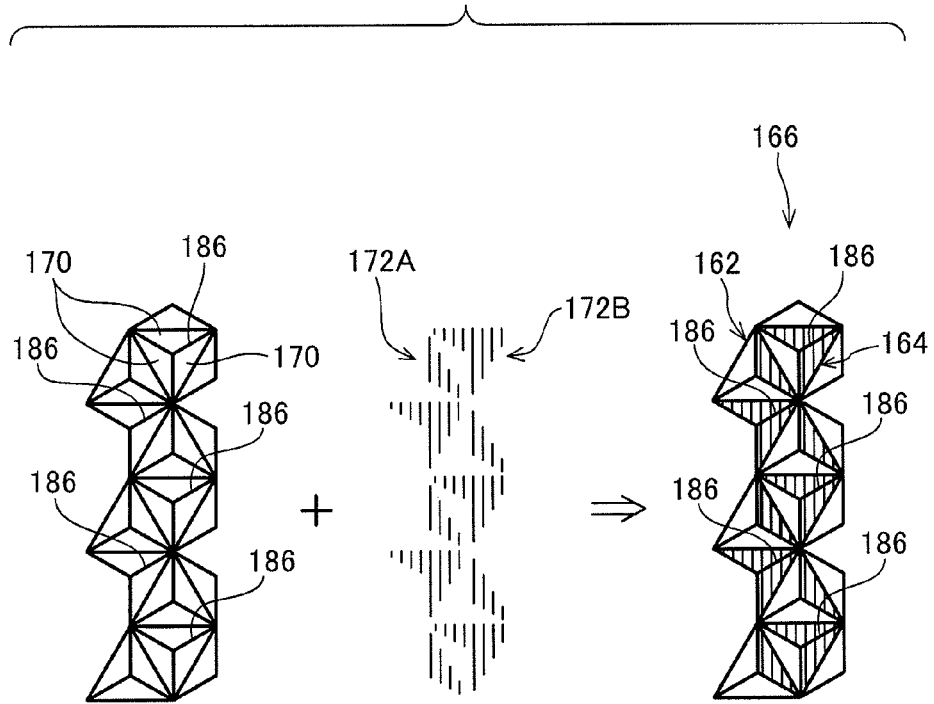
FIG. 15 is a descriptive diagram of a concept of arrangement of first decoration elements and second decoration elements in the fourth exemplary embodiment.

The outward triangular shapes 162 and inward triangular shapes 164 are arrayed in a staggered arrangement in the tire radial direction R and the tire circumferential direction U. That is, the outward triangular shapes 162 and inward triangular shapes 164 are alternately arranged in the tire circumferential direction U and are alternately arranged in the tire radial direction R. The concept of arranging the outward triangular shapes 162 and inward triangular shapes 164 alternately thus is described in FIG. 15. As shown in FIG. 15, in the present exemplary embodiment, positions of arrangement of the outward triangular shapes 162 and the inward triangular shapes 164 are offset.

According to this constitution, the first decoration elements 170 and the second decoration elements 172A and 172B are periodically arranged in each side band 116. The same effects as in the second exemplary embodiment may be realized with the present exemplary embodiment.

—Fifth Exemplary Embodiment—

Figure 16:
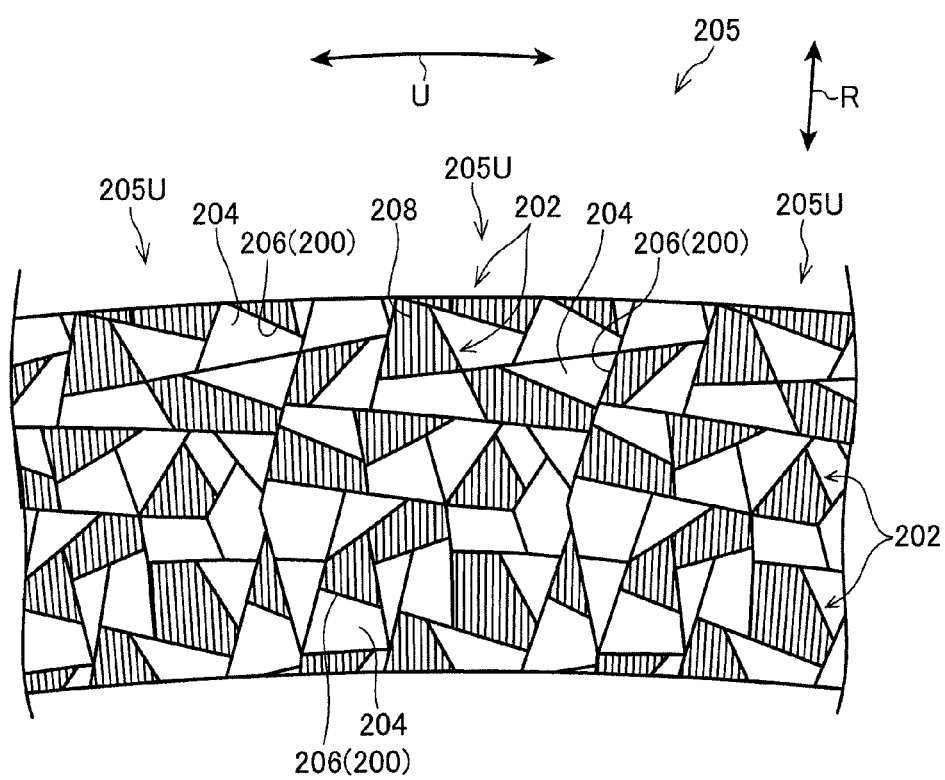
FIG. 16 is a partial enlarged side view of a side decoration band of a pneumatic tire in accordance with a fifth exemplary embodiment.

Next, a fifth exemplary embodiment is described. In the present exemplary embodiment, as shown in FIG. 16, a side decoration band 205 in a circular arc shape is formed at the side portion 114 of the pneumatic tire 100 shown in FIG. 9. The side decoration band 205 is formed by a combination of plural first decoration elements 200 and second decoration elements 202. Two of the side decoration band 205 are formed so as to be disposed at symmetrical positions sandwiching the tire central axis. Similarly to the second exemplary embodiment and the third exemplary embodiment, the marked portions 130 are formed at the side portion (see FIG. 9).

The first decoration elements 200 are formed only by first ridges 206 that form outlines of smooth surface regions 204. In the present exemplary embodiment, the first ridges 206 are constituted by plural linear ridges whose directions are arbitrary.

The second decoration elements 202 are constituted by the first ridges 206 that form that outlines, and second ridges 208 that are arrayed inside the first ridges 126 and have smaller heights than the first ridges 206. The second ridges 208 all extend in the tire radial direction R.

The concept of forming the first decoration elements 200 and second decoration elements 202 thus is described in FIG. 17. As shown in FIG. 17, in the present exemplary embodiment, positions of arrangement of the first ridges 206 constituting the first decoration elements 200 and the second ridges 208 constituting the second decoration elements 202 are not particularly offset conceptually, but by the first ridges 206 being disposed so as to form the first decoration elements 200, side decoration band units 205U that constitute the side decoration band 205 are formed. Thus, the side decoration band 205 is formed by the side decoration band units 205U being continuously arranged in the tire circumferential direction U.

According to the present exemplary embodiment, even with a simple structure in which the positions of arrangement of the first decoration elements 200 and the second decoration elements 202 are not periodically aligned, because the first ridges 206 have greater heights than the second ridges 208, similarly to the second exemplary embodiment, the appearance is significantly improved over a case in which the heights are the same.

Because the positions of arrangement of the first decoration elements 200 and the second decoration elements 202 in one of the side decoration band units 205U are not periodic, the side decoration band 205 in which the side decoration band units 205U are arranged continuously in the tire circumferential direction U, that is, the side decoration band units 205U are arranged periodically in the tire circumferential direction U, appears as if the first decoration elements 200 and the second decoration elements 202 with arbitrary shapes are arranged non-periodically. Therefore, compared to a case in which decoration elements are arranged arbitrarily over the whole of a side decoration band instead of the side decoration band units 205U being formed, the side decoration band 205 that appears to be non-periodic may be fabricated much more easily.

—Sixth Exemplary Embodiment—

Figure 18A:
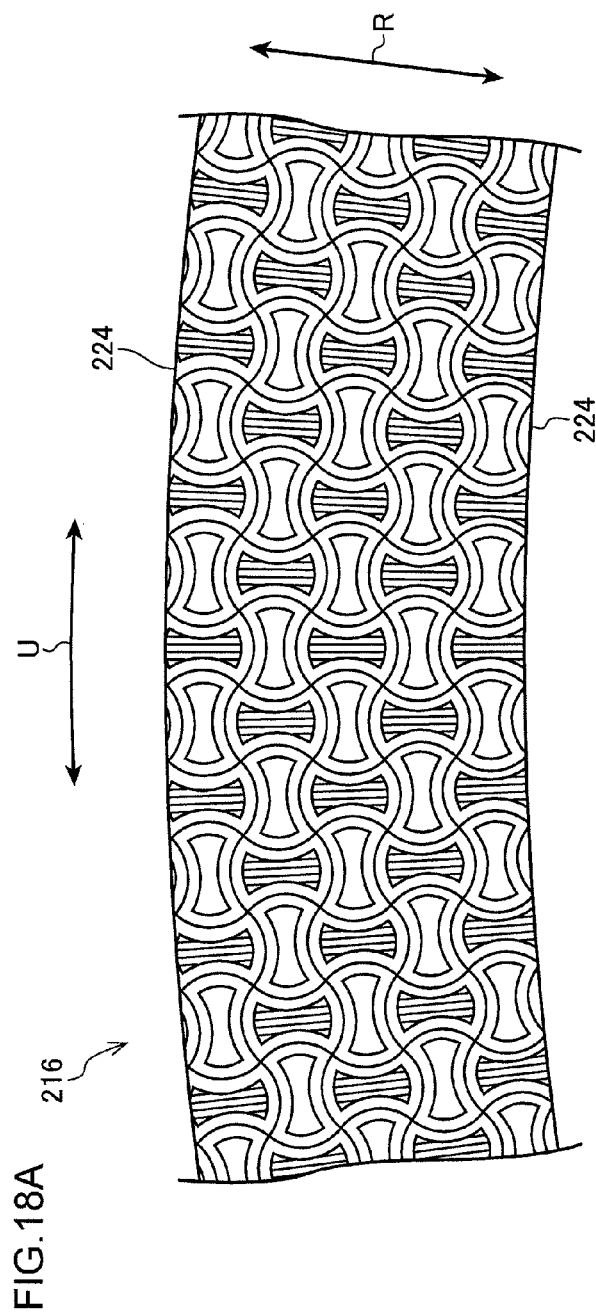
FIG. 18A is a partial enlarged side view of a side decoration band of a pneumatic radial tire in accordance with a sixth exemplary embodiment.
Figure 18B:
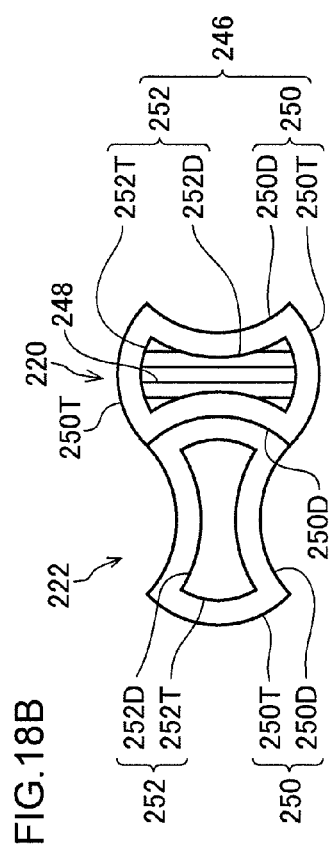
FIG. 18B is an enlarged view of principal portions in FIG. 18A.

Next, a sixth exemplary embodiment is described. In the present exemplary embodiment, as shown in FIG. 18A and FIG. 18B, a side decoration band 216 in a circular arc shape is formed at the side portion 114 of the pneumatic tire 100 shown in FIG. 9. The side decoration band 216 is formed by a combination of plural first decoration elements 220 and second decoration elements 222. Two of the side decoration band 216 are formed so as to be disposed at symmetrical positions sandwiching the tire central axis. Similarly to the second exemplary embodiment and the third exemplary embodiment, the marked portions 130 are formed at the side portion (see FIG. 9). Periphery ridges 224 are formed at peripheral edge portions at the tire radial direction outer side and inner side of each side decoration band 216.

Each first decoration element 220 is constituted by first ridges 246 that divide up the region and second ridges 248 that are arrayed inside the first ridges 246.

Each first ridge 246 has a somewhat long, narrow shape and is constituted by an outer ridge 250 and an inner ridge 252, which is formed to be separated from the outer ridge 250 to the inner side by a constant spacing. The outer ridge 250 is constituted by outer side convex portions 250T, which are formed at each of two length direction ends of the outer ridge 250 and each have the shape of a curved protrusion to the outer side, and outer side concave portions 250D, which are formed at each of two short direction ends of the outer ridge 250 and each have the shape of a curved protrusion to the inner side, that is, the shape of a recess curved from the outer side. The inner ridge 252 is constituted by inner side convex portions 252T, which are formed at each of two length direction ends of the inner ridge 252 and each have the shape of a curved protrusion to the outer side, and inner side concave portions 252D, which are formed at each of two short direction ends of the inner ridge 252 and each have the shape of a curved recess from the outer side. The second ridges 248 are ridges that extend linearly in the length direction of the first decoration elements 220.

Each second decoration element 222 is formed in the same shape as the first ridges 246 of the first decoration element 220 and is disposed such that its orientation is 90° different from the first decoration element 220. The second ridges 248 are not formed in the second decoration element 222. Descriptions hereinafter are given with the structural elements of the second decoration elements 222 (the first ridges 246 and the second ridges 248) being assigned the same reference numerals as the structural elements of the first decoration elements 220.

The first decoration elements 220 and the second decoration elements 222 are arranged periodically in the side decoration band 216. Giving a detailed description, in the side decoration band 216, the first decoration elements 220 and the second decoration elements 222 are arranged alternately in the tire circumferential direction U and in the tire radial direction R (in a checkered pattern). The dimensions of the outer side convex portions 250T and the outer side concave portions 250D are specified in advance (for example, if the outer side convex portions 250T and outer side concave portions 250D are formed in circular arc shapes, the radiuses of curvature and arc lengths of the outer side convex portions 250T and outer side concave portions 250D are specified in advance) such that the outer ridges 250 of the first decoration elements 220 and the outer ridges 250 of the second decoration elements 222 connect up without forming angular portions.

As described above, in the present exemplary embodiment, each side decoration band 216 in which the first decoration elements 220 and second decoration elements 222 are arranged to alternate in the tire circumferential direction and the tire radial direction R is formed at the side portion 114. The first decoration elements 220 are constituted by the first ridges 246 that divide up the region and the linear second ridges 248 that are arrayed inside the first ridges 246. The second decoration elements 222 have the same shape as the first ridges 246 of the first decoration elements 220 and differ in orientation by 90°.

The first ridges 246 serve the function of framing the decoration pattern, and the second ridges 248 serve the function of improving visibility. In each side decoration band 216, because the first decoration elements 220 and the second decoration elements 222 are alternately continuous and arranged periodically, uniformity and regularity of the side decoration band 216 are apparent, and unevenness of a region in which the side decoration band 216 is formed may be made less obvious. Further, because the first ridges 246 have curved shapes, this effect is even more striking Because the outer ridges 250 of the first decoration elements 220 and the outer ridges 250 of the second decoration elements 222 are continuous such that angular portions are not formed, the effect of uniformity and regularity being apparent is further provided.

Because the orientations of the first decoration elements 220 and the second decoration elements 222 differ by 90°, central directions of extension of the first ridges 246 differ by 90° and directions of extension of the second ridges 248 differ by 90°. Thus, the appearance (aesthetics) of the tire side face is further improved.

The respective first ridges 246 of the first decoration elements 220 and the second decoration elements 222 have curved shapes. Therefore, light that is incident from one direction may be reflected over a wide angular range, and unevenness of the region of the tire may be made even less obvious.

Figure 19:
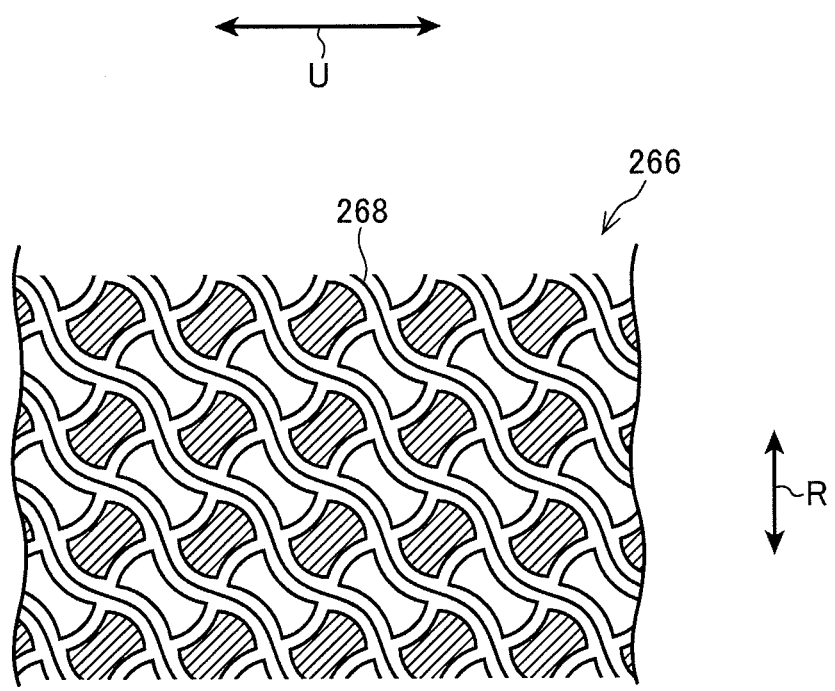
FIG. 19 is a partial enlarged side view of a variant example of the side decoration band of the pneumatic tire in accordance with the sixth exemplary embodiment.

As shown in FIG. 19, if, in contrast to the present exemplary embodiment, the first decoration elements and second decoration elements are formed as a side decoration band 266 that is twisted by 45° to the right in the drawing, the same effects may be realized. As shown in FIG. 19, outer ridges 268 may be formed that are disposed only where each outer ridge opposes a first decoration element and a second decoration element at both sides, and that appear to be extending in wave shapes along one direction.

—Seventh Exemplary Embodiment—

Figure 20:
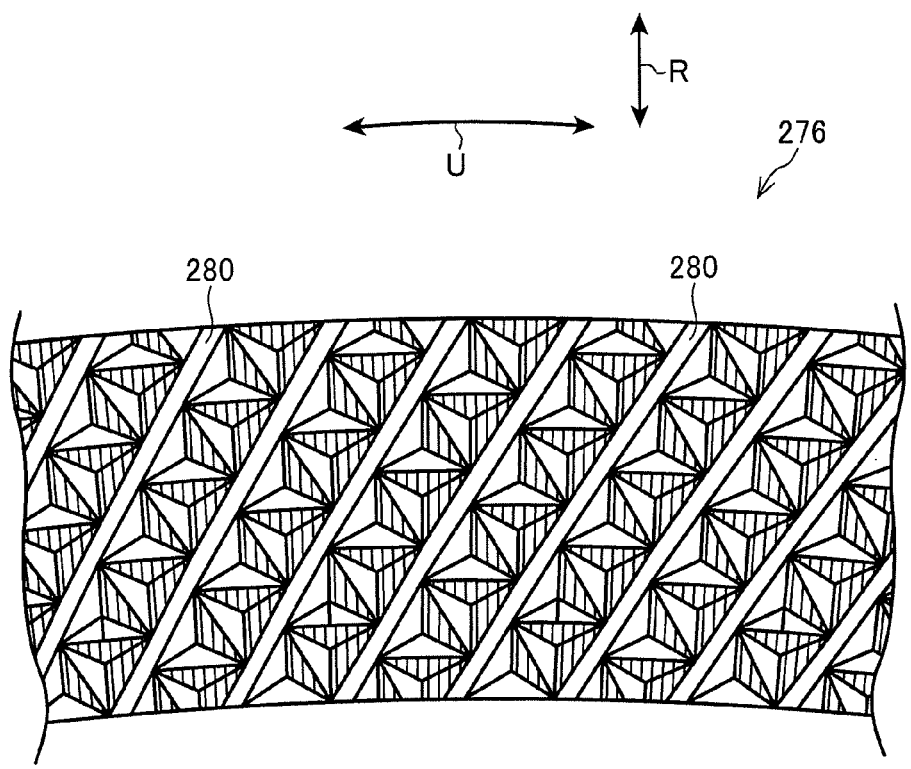
FIG. 20 is a partial enlarged side view of a side decoration band of a pneumatic tire in accordance with a seventh exemplary embodiment.

Next, a seventh exemplary embodiment is described. In the present exemplary embodiment, as shown in FIG. 20, a side decoration band 276 is formed at the side portion 114 of the pneumatic tire 100 shown in FIG. 9. In the side decoration band 276, in contrast to the fourth exemplary embodiment, band-shaped smooth surfaces 280 are formed that are inclined 30° to the right in the drawing with respect to the tire radial direction.

With the present exemplary embodiment, in addition to the effects realized in the fourth exemplary embodiment, an effect of improving appearance with the band-shaped smooth surfaces 280 is realized.

—Eighth Exemplary Embodiment—

Figure 21:
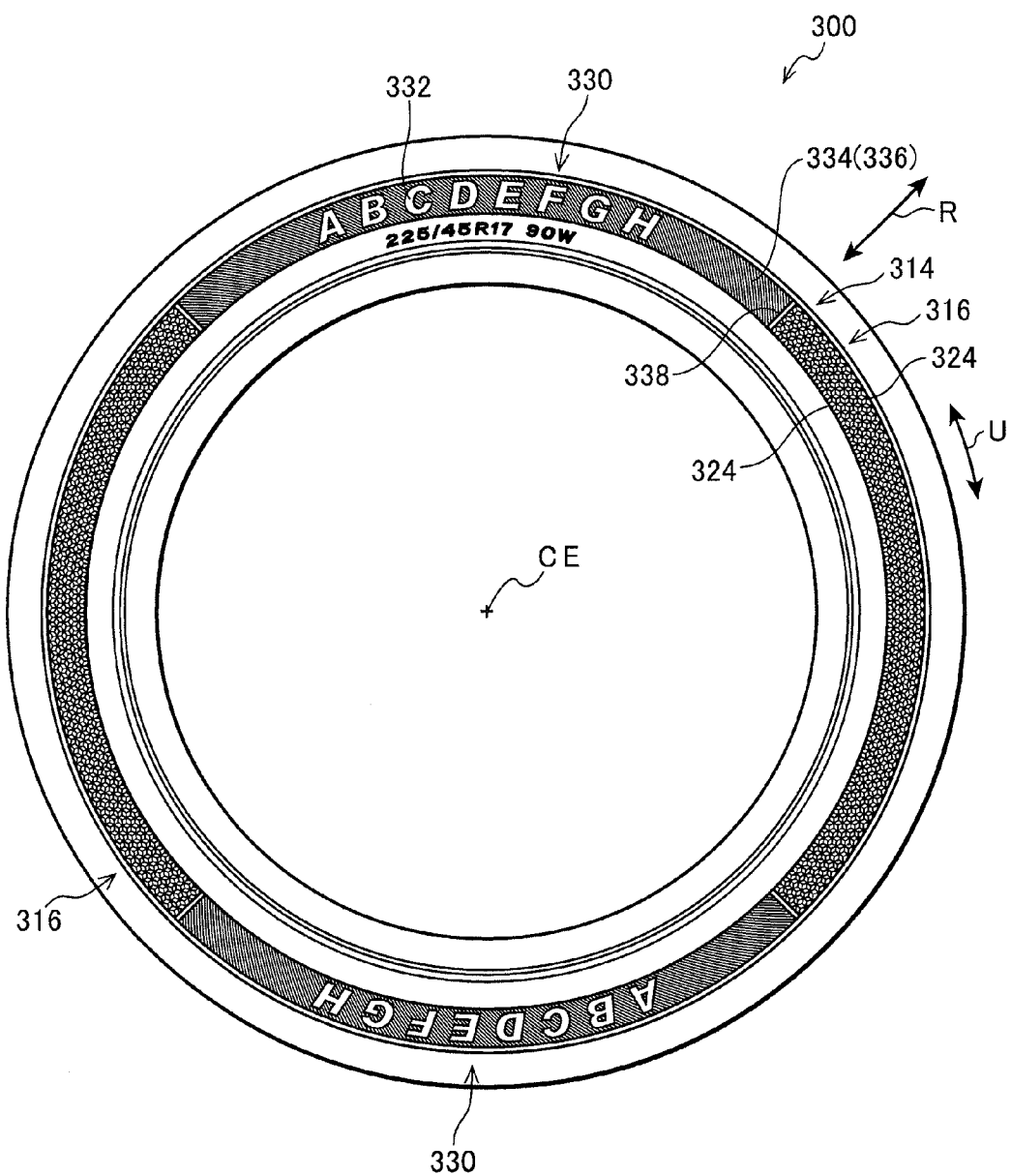
FIG. 21 is a side view of a pneumatic tire in accordance with an eighth exemplary embodiment.
Figure 22A:
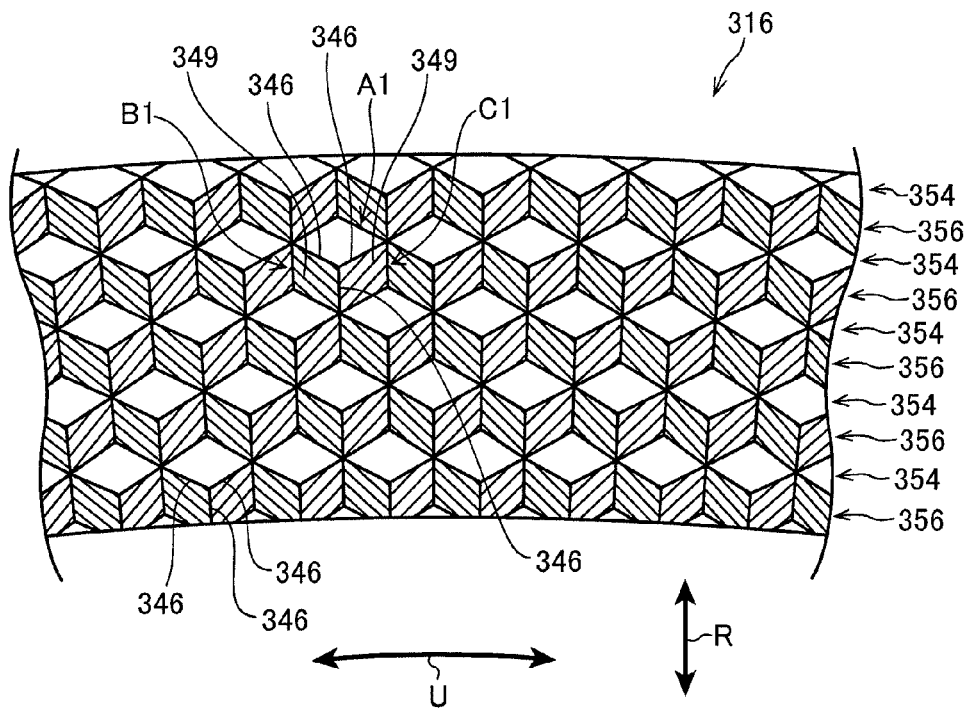
FIG. 22A is a partial enlarged side view of a tire side portion of a pneumatic tire in accordance with the eighth exemplary embodiment.

Next, an eighth exemplary embodiment is described. FIG. 21 is a side view of a pneumatic tire 300 in accordance with the present exemplary embodiment. As shown in FIG. 21 and FIG. 22A, a side decoration band 316 in a circular arc shape (see FIG. 21 and FIG. 22A) is formed at a side portion 314 of the pneumatic tire 300. The side decoration band 316 is formed by a combination of plural first decoration elements A1, second decoration elements B1 and third decoration elements C1. Two of the side decoration band 316 are formed so as to be disposed at symmetrical positions sandwiching a tire central axis CE (see FIG. 21).

At the side portion 314, marked portions 330 are formed in circular arc shapes so as to be adjacent at respective both end portions thereof with one side decoration band 316 and the other side decoration band 316. Thus, two of the marked portions 330 are formed so as to be disposed at symmetrical positions sandwiching the tire central axis CE. Marks 332 are displayed as, for example, the characters "ABCDEFGH", which are presented as smooth surfaces. Numerous ridges 334 are arrayed in surrounding regions 336 of the marked portions 330 excluding the marks 332.

As shown in FIG. 22A, in each side decoration band 316, plural numbers of the first decoration elements A1, the second decoration elements B1 and the third decoration elements C1 are combined periodically. The two of the side decoration bands 316 are formed so as to be disposed at the symmetrical positions sandwiching the tire central axis.

Each first decoration element A1 is formed only by first ridges 346 that form an outline of a smooth surface region 344 in a diamond shape whose length direction is in the tire circumferential direction U. Of reflected light from the smooth surface regions 344, reflected light that is reflected in the normal direction of the smooth surface regions 344 is brightest and is easy to discern.

Each second declaration element B1 is constituted by the first ridges 346 forming an outline of a region with a parallelogram shape, which is angled upward to the left in the drawing, and second ridges 349, which are arrayed inside the first ridges 346 so as to extend in a direction to the upper left of the drawing. Of light reflected from surfaces of the second ridges 349, reflected light that is reflected in the normal directions of these surfaces is brightest and is easy to discern.

Each third declaration element C1 is constituted by the first ridges 346 forming an outline of a region with a parallelogram shape, which is angled upward to the right in the drawing, and the second ridges 349, which are arrayed inside the first ridges 346 so as to extend in a direction to the upper right of the drawing. In the present exemplary embodiment, the directions of extension of the second ridges 349 differ by 90° between the second decoration elements B1 and the third decoration elements C1.

The first decoration elements A1, second decoration elements B1 and third decoration elements C1 are structured to share overlapping regions with one another. In the present exemplary embodiment, the heights of the second ridges 349 are lower than those of the first ridges 346.

The first decoration elements A1 are arrayed in lines in the tire circumferential direction U. The second decoration elements B1 and third decoration elements C1 are arrayed alternately in the tire circumferential direction U. First decoration element rows 354 in which the first decoration elements A1 are arrayed in the tire circumferential direction U and second decoration element rows 356 in which the second decoration elements B1 and third decoration elements C1 are arrayed in the tire circumferential direction U are alternately arrayed in the tire radial direction R. The first decoration element rows 354 sandwiching each of the second decoration element rows 356 from both tire radial direction sides thereof are disposed so as to be offset relative to one another in the tire circumferential direction U by half of the tire circumferential direction length of each decoration element A1. The second decoration element rows 356 sandwiching each of the first decoration element rows 354 from both tire radial direction sides thereof are disposed so as to be offset relative to one another in the tire circumferential direction U by the tire circumferential direction length of each of the second decoration elements B1 and third decoration elements C1.

The concept of arranging the first decoration elements A1, second decoration elements B1 and third decoration elements C1 thus is described in FIG. 23. As shown in FIG. 23, in the present exemplary embodiment, the first decoration elements A1, second decoration elements B1 and third decoration elements C1 are formed in matching diamond shapes of which sets of three respectively constitute regular hexagon shapes. Therefore, the first decoration elements A1, second decoration elements B1 and third decoration elements C1 have diamond shapes whose large angles are 120° and small angles are 60°.

Positions of arrangement of the first ridges 346, the second ridges 349 and the smooth surface regions 344 are specified in advance and the first ridges 346, second ridges 349 and smooth surface regions 344 are combined such that the smooth surface regions 344 are formed inside the first ridges 346 at the first decoration elements A1, the inside second ridges 349 are arrayed in the second decoration elements B1, and the second ridges 349 are also arrayed in the third decoration elements C1 (but the second ridges 349 of the third decoration elements C1 and the second ridges 349 of the second decoration elements B1 are arrayed such that the extension directions thereof differ by 90°).

According to this structure, the first decoration elements A1, second decoration elements B1 and third decoration elements C1 are arranged periodically in the side decoration bands 316.

As described above, the side decoration bands 316 are formed at the side portion 314 in the present exemplary embodiment. In each side decoration band 316, the first decoration elements Al, second decoration elements B1 and third decoration elements Cl are arranged periodically in the tire circumferential direction U and in the tire radial direction R. The smooth surface regions 344 are formed inside the first ridges 346 of the first decoration elements A1, the second ridges 349 are arrayed inside the first ridges 346 of the second decoration elements Bl, and the second ridges 349 that form angles of 90° with the second ridges 349 of the second decoration elements B1 are arrayed in the third decoration elements Cl. Therefore, three mutually different kinds of shading (gradations) can be seen in the side decoration band 316. Thus, differences in brightness (light and shade of shadows) due to differences in reflection directions of light may be effectively exhibited by the first decoration elements Al, second decoration elements B1 and third decoration elements Cl. At the smooth surface regions 344, the reflectance is higher and reflection directions are in the same direction. Thus, the pneumatic tire 300 may be formed with which glossy shades are distinct, a sense of high quality may be imparted, and the appearance (aesthetics) is improved. This is particularly striking if a wax is applied to the side decoration bands 316.

The first ridges 346 have greater heights than the second ridges 349. Therefore, the first ridges 346 serve the function of framing the decoration pattern and the second ridges 349 serve the function of improving the appearance. Thus, the appearance is further improved. The dimensions of the ridges may be made different by making the machining depths different when the ridges are being formed by tooling, etching or the like.

In each side decoration band 316, the first decoration elements A1, second decoration elements B1 and third decoration elements C1 are continuously formed to be periodic. Thus, unevenness of the region in which the side decoration band 316 is formed may be made less obvious.

The first ridges 346 forming the outer edges of the first decoration elements A1, second decoration elements B1 and third decoration elements C1 have the same shapes as one another and have the same ridge heights as one another. Thus, uniformity and regularity of the side decoration band 316 are strikingly apparent, and a further effect of making unevenness of the side decoration band 316 less obvious is provided. In a situation in which incidence angles of light are changing in short periods (particularly a situation in which the tire is turning), reflected lights from the first decoration elements A1, second decoration elements B1 and third decoration elements C1 can be continually seen at intervals of certain durations, and the side decoration portions appear with strong uniformity and regularity.

The directions of extension of the second ridges 349 differ by 90° between the second decoration elements B1 and the third decoration elements Cl. Therefore, the light and shade of shadows changes regularly when the pneumatic tire 300 is turning at a turning speed such that the first decoration elements Al, second decoration elements B1 and third decoration elements Cl can be seen, and the appearance (aesthetics) of the side portion 314 is further improved.

In the present exemplary embodiment, the pneumatic tire 100 is provided with the marked portions 130 at the side portion 114, the marked portions 130 display the marks 132, and the marked portions 130 are respectively adjacent at both ends to the first decoration elements A1 and second decoration elements B1. Thus, the visibility of the marked portions 130 is improved, which is to say, visibility of the marks 132 is improved.

The marks 132 are presented as smooth surfaces, and the ridges 34 (for example, straight or curved ridges) are arrayed in the surrounding regions 136 of the marked portions 130 excluding the marks 132. Thus, the visibility of the marks 132 is further improved and the impact on a person viewing the marks 132 is substantial. Because two of the side decoration bands 316 are formed and the side decoration bands 316 are disposed at both tire circumferential direction sides of each of the marked portions 130, the marks 132, for which high visibility is important, may be made more obvious.

Below, a specific favorable example of the first ridges 346 and second ridges 316, and spacings thereof and suchlike, is illustrated.

Figure 22B:
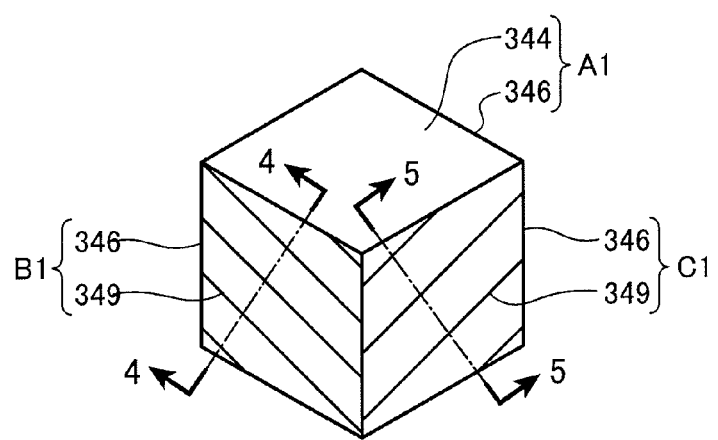
FIG. 22B is an enlarged view of principal portions in FIG. 22A.
Figure 24:
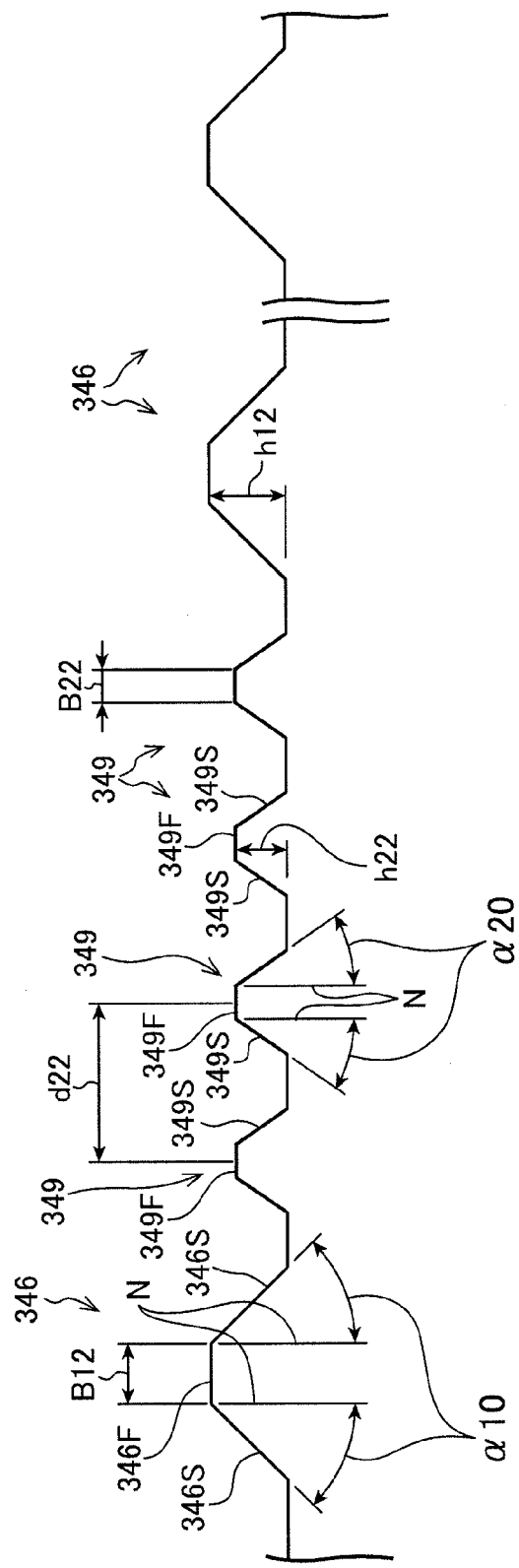
FIG. 24 is a sectional diagram viewed from line 4-4 of FIG. 22B.

FIG. 24 is a sectional diagram viewed from line 4-4 of FIG. 22B. As illustrated in FIG. 24, each first ridge 346 structuring the second decoration elements B1 has a trapezoid shape in cross-section. A width B12 of a flat surface 346F forming a top portion of the first ridge 346 is a maximum of 0.2 mm. Inclined faces (side faces) 346S of the first ridge 346 form angles $\alpha 10$ of 45° with respect to a normal direction N of the side decoration band 316. A height h12 of the first ridge 346 is 0.2 mm (it is preferable that h12 be in the range from 0.15 to 0.35 mm). The height of dividing ridges 338 (see FIG. 21) that extend in the tire radial direction R and divide the side decoration bands 316 from the marked portions 330 is 0.4 mm.

Each second ridge 349 is also a trapezoid in cross-section. A width B22 of a flat surface 349F forming a top portion of the second ridge 349 is a maximum of 0.2 mm. Inclined faces (side faces) 349S of the second ridge 349 form angles $\alpha 20$ of 35° with respect to a normal direction N of the side decoration band 316. A height h22 of the second ridge 349 is 0.15 mm (it is preferable that h22 be in the range from 0.1 to 0.3 mm). A spacing d22 between adjacent second ridges 349 is 0.6 mm.

Figure 25:
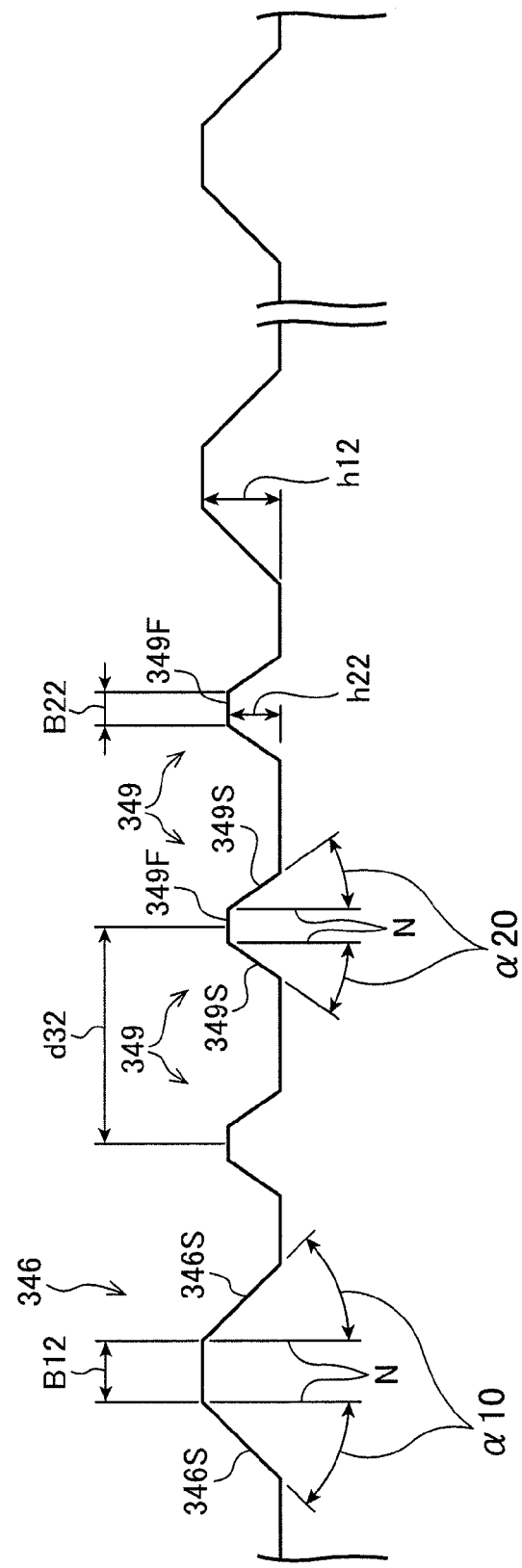
FIG. 25 is a sectional diagram viewed from line 5-5 of FIG. 22B.

FIG. 25 is a sectional diagram viewed from line 5-5 of FIG. 22B. As illustrated in FIG. 25, the cross-sectional dimensions of the first ridges 346 and second ridges 349 structuring the third decoration elements C1 are respectively the same as those of the first ridges 346 and second ridges 349 structuring the second decoration elements B1. A spacing d32 between adjacent ones of these second ridges 349 is 0.8 mm.

Thus, because the inclination angles of the side faces 346S of the first ridges 346 and the side faces 348S of the second ridges 348 are different ($\alpha 10$ and $\alpha 20$ are different), the function of the first ridges 346 framing the decoration pattern and the function of the second ridges 349 improving the visibility of the pattern may be even more distinctly served. Moreover, because of the relationships, $h12 > h22$ and $\alpha 10 > \alpha 20$, this is realized even further.

A pitch of the second ridges 349 arrayed in the third decoration elements C1 (the spacing d32 between adjacent second ridges 349), is larger than a pitch of the second ridges 349 arrayed in the second decoration elements B1 (the spacing d22 between adjacent second ridges 349). Thus, the second ridges 349 are arrayed with a higher density in the second decoration elements B1 than in the third decoration elements C1. Therefore, a difference in shade may be effectively exhibited by the difference in pitches between the second decoration elements B1 and the third decoration elements C1. This is particularly effective for making brightness differences between the second decoration elements B1 and the third decoration elements C1 sufficiently visible when incident amounts of light on the tire side portion are small.

Sufficient effects of visibility, endurance and the like may be realized, provided these dimensions are within a range of ±50% of the values illustrated here, preferably within a range of ±30%.

—Ninth Exemplary Embodiment—

Figure 26:
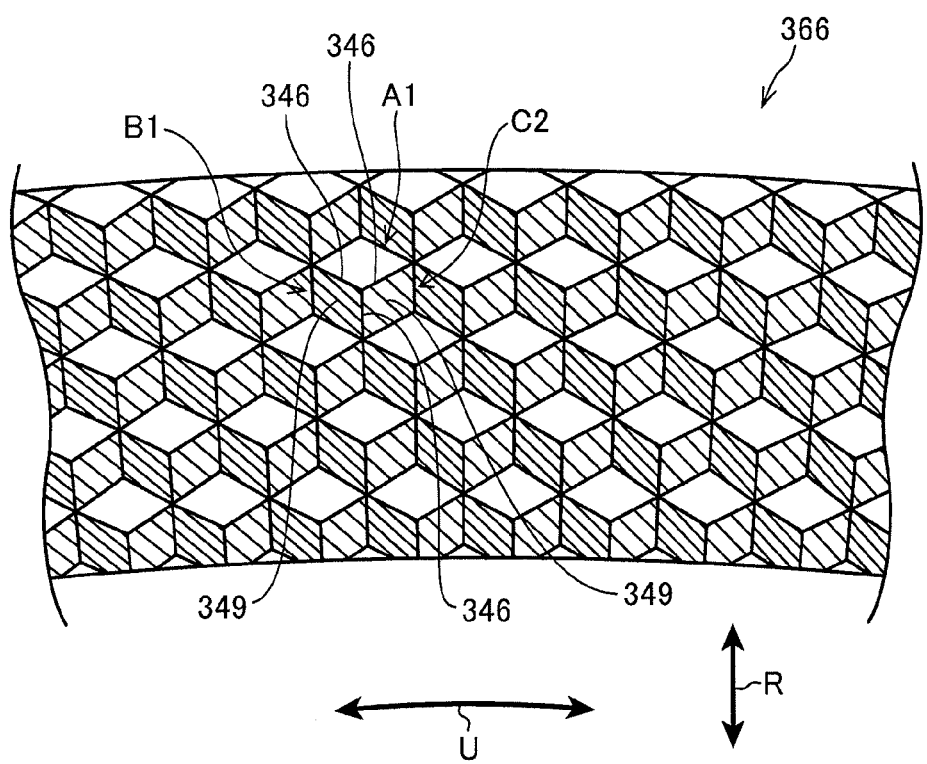
FIG. 26 is a partial enlarged side view of a side decoration band of a pneumatic tire in accordance with a ninth exemplary embodiment.

Next, a ninth exemplary embodiment is described. As shown in FIG. 26, at a side portion of a pneumatic tire according to the present exemplary embodiment, a side decoration band 366 is formed in which, in contrast with the eighth exemplary embodiment, third decoration elements C2 are arranged instead of the third decoration elements C1 (see FIG. 22B).

In the third decoration elements C2, in contrast with the third decoration elements C1 described in the eighth exemplary embodiment, the direction of extension of the second ridges 349 is the same as that of the second ridges 349 of the second decoration elements B1.

In the present exemplary embodiment too, three kinds of mutually different shading (gradation) can be seen in the side decoration band 366, and the same effects as in the eighth exemplary embodiment may be provided.

Exemplary embodiments of the present invention have been illustrated and described hereabove, but the above exemplary embodiments are merely examples and numerous modifications may be embodied within a scope not departing from the spirit of the present invention. It will be obvious that the scope of the present invention is not to be limited to the above exemplary embodiments.

The invention claimed is:

1. A tire comprising a decoration portion at a tire side portion, the decoration portion including:
   decoration elements that include first ridges that are inclined in a first direction with respect to a tire circumferential direction, and that are inclined in a second direction that is a different direction to the first direction; and second ridges that are smaller than the first ridges in at least one of the height or width; and
   first depressions that are inclined with respect to the tire circumferential direction, that divide the decoration elements into two or more regions, and that make portions of the first ridges that are inclined in the first direction non-continuous in the tire circumferential direction, wherein the decoration elements comprise:
   first decoration elements, outer edge portions of which are formed by the first ridges, inner sides of the outer edge portions being smooth surfaces; and second decoration elements, outer edge portions of which are formed by the first ridges, the second ridges being arrayed at inner sides of the outer edge portions,
   and wherein at least a portion of the first ridges are inclined with respect to the first direction and are adjacent to one another, and second depressions are formed between the adjacent first ridges, and wherein decoration element rows are formed by the first decoration elements and the second decoration elements being arranged alternately along the second depressions.

2. The tire according to claim 1, wherein the second depressions are continuous along the decoration element rows between adjacent of the decoration element rows.

3. The tire according to claim 1, wherein a direction in which the first depressions and the second depressions extend forms an angle with respect to the tire circumferential direction in a range of from 20° to 90°.

4. The tire according to claim 1, wherein a floor width of the first depressions and a floor width of the second depressions is from 0.2 mm to less than a maximum width of the decoration elements.

5. The tire according to claim 1, wherein a height of the decoration elements is from 0.1 mm to less than 0.3 mm.

6. A tire comprising a decoration portion at a tire side portion, the decoration portion including:
   decoration elements that include first ridges that are inclined in a first direction with respect to a tire circumferential direction, and that are inclined in a second direction that is a different direction to the first direction; and second ridges that are smaller than the first ridges in at least one of height or width; and
   first depressions that are inclined with respect to the tire circumferential direction, that divide the decoration elements into two or more regions, and that make portions of the first ridges that are inclined in the first direction non-continuous in the tire circumferential direction, wherein the decoration elements comprise:
   first decoration elements, outer edge portions of which are formed by the first ridges, inner sides of the outer edge portions being smooth surfaces; and second decoration elements, outer edge portions of which are formed by the first ridges, the second ridges being arrayed at inner sides of the outer edge portions,
   and wherein at least a portion of the first ridges are inclined with respect to the first direction and are adjacent to one another, and second depressions are formed between the adjacent first ridges, and wherein decoration element rows are formed by the first decoration elements and the second declaration elements being arranged alternately along the first depressions and the second depressions.

* * * * *